United States Patent
Bergeron et al.

(10) Patent No.: US 9,748,759 B1
(45) Date of Patent: Aug. 29, 2017

(54) LIGHTNING ELECTROMAGNETIC PULSE (LEMP) DETECTOR AND ISOLATION DEVICE

(71) Applicants: Donald J. Bergeron, Lewisville, TX (US); Gary Michael Bishop, Kegworth (GB); Michael Andrew Oliver, Loughborough (GB)

(72) Inventors: Donald J. Bergeron, Lewisville, TX (US); Gary Michael Bishop, Kegworth (GB); Michael Andrew Oliver, Loughborough (GB)

(*) Notice: Subject to any disclaimer, the term of this patent is extended or adjusted under 35 U.S.C. 154(b) by 289 days.

(21) Appl. No.: 14/709,418

(22) Filed: May 11, 2015

Related U.S. Application Data

(60) Provisional application No. 61/990,889, filed on May 9, 2014.

(51) Int. Cl.
  H01H 35/00 (2006.01)
  H02H 3/00 (2006.01)
  G01W 1/00 (2006.01)

(52) U.S. Cl.
  CPC ............... *H02H 3/00* (2013.01); *G01W 1/00* (2013.01)

(58) Field of Classification Search
  None
  See application file for complete search history.

(56) References Cited

U.S. PATENT DOCUMENTS

| | | | |
|---|---|---|---|
| 3,790,884 A | 2/1974 | Kohl | |
| 3,891,919 A | 6/1975 | Penninger | |
| 4,095,262 A | 6/1978 | St. Clair | |
| 4,276,576 A | 6/1981 | Uman et al. | |
| 5,083,042 A | 1/1992 | Merchant | |
| 5,396,220 A | 3/1995 | Markson et al. | |
| 5,453,899 A | 9/1995 | Page | |
| 6,586,920 B1 | 7/2003 | Hirakawa | |
| 7,266,455 B2 | 9/2007 | Kahkoska | |
| 8,841,898 B2 | 9/2014 | Van Deventer | |
| 2007/0109701 A1* | 5/2007 | Fickey | H02H 1/04 361/62 |
| 2009/0281730 A1* | 11/2009 | Said | G01W 1/16 702/4 |
| 2011/0102767 A1 | 5/2011 | Volanthen et al. | |

(Continued)

*Primary Examiner* — Lincoln Donovan
*Assistant Examiner* — Khareem E Almo
(74) *Attorney, Agent, or Firm* — Law Office of Sam Sokhansanj PLLC

(57) ABSTRACT

An advance warning lightning electromagnetic pulse (LEMP) storm detection device, system, and method for automatically protecting, disconnecting, and isolating electronic equipment in anticipation of a potential storm, thereby preventing damage to electronics susceptible to power surges caused by lightning strikes or earth ground fault events. The storm detection device can include a coaxial isolation switch, a radio receiver, a controller having a processor, wherein the controller further includes an isolation detection unit. In addition, the storm detection device can further include a drive motor, one or more input electrical contacts, and one or more output electrical contacts engaged with the input electrical contacts. Further, wherein in response to the radio receiver detecting one or more lightning strikes, the controller operates the drive motor to disengage the input electrical contacts and output electrical contacts from each other.

20 Claims, 35 Drawing Sheets

(56) References Cited

U.S. PATENT DOCUMENTS

| | | | | |
|---|---|---|---|---|
| 2012/0154971 A1* | 6/2012 | Brashear | ............... | H02H 3/22 |
| | | | | 361/118 |
| 2013/0009780 A1* | 1/2013 | Marshall | ............... | G01W 1/16 |
| | | | | 340/601 |
| 2013/0329329 A1* | 12/2013 | Liu | ............... | H02H 9/02 |
| | | | | 361/93.1 |
| 2013/0345982 A1* | 12/2013 | Liu | ............... | G01W 1/16 |
| | | | | 702/4 |
| 2014/0324349 A1* | 10/2014 | Agronow | ............... | G01W 1/00 |
| | | | | 702/3 |
| 2015/0256277 A1* | 9/2015 | Johnson | ............... | H04L 51/14 |
| | | | | 340/601 |
| 2016/0018563 A1* | 1/2016 | Candor | ............... | G01W 1/16 |
| | | | | 324/72 |
| 2016/0299257 A1* | 10/2016 | Moehrlein | ............... | G01W 1/10 |
| 2016/0356922 A1* | 12/2016 | McCann | ............... | G01W 1/00 |

* cited by examiner

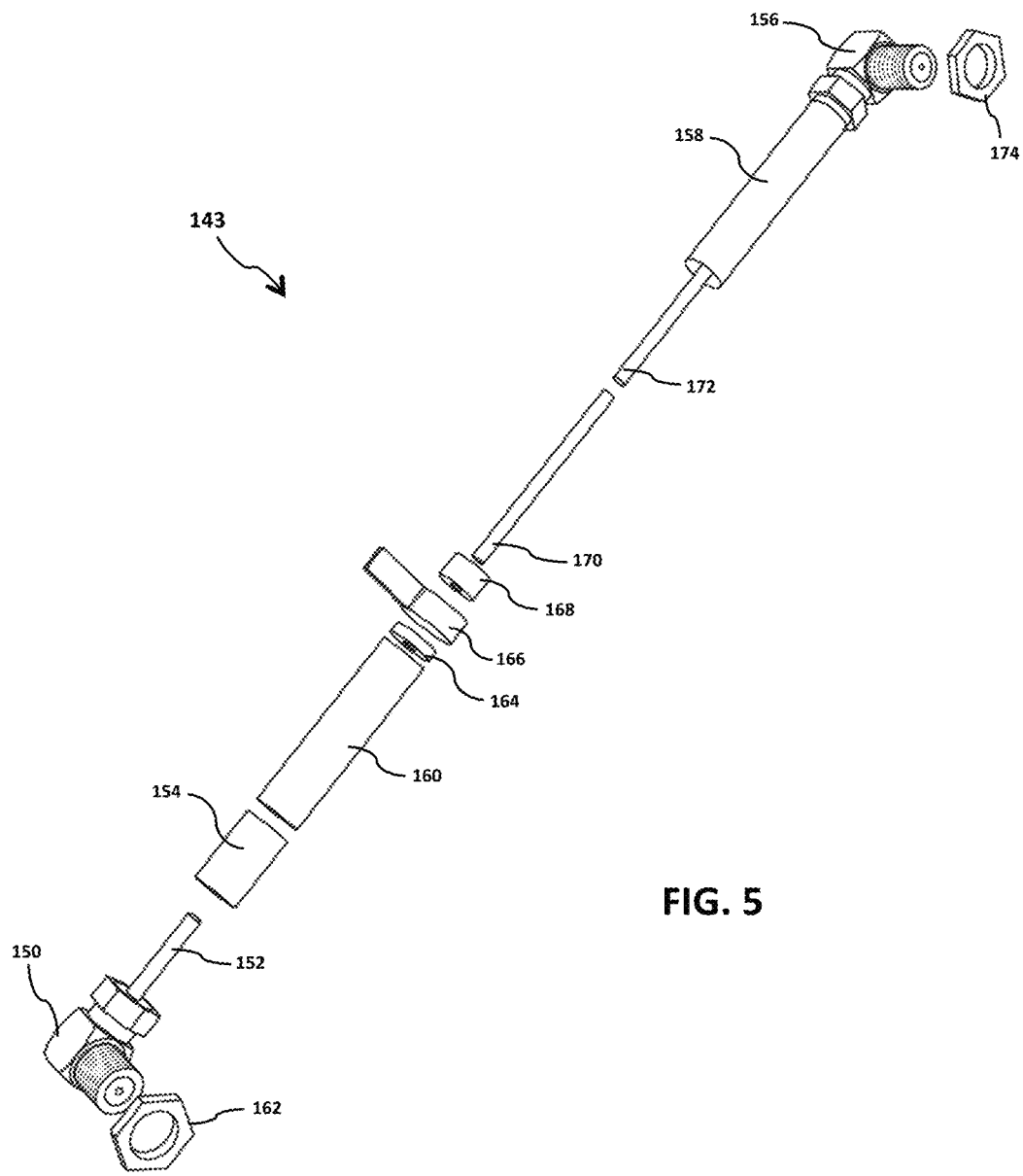

LOW – LEVEL SUBROUTINES

< BEEP_ nMS >

MOTOR ROUTINES

< MOTOR _ FORWARD >

BOTH SUBROUTINES END-UP WITH THE MOTOR IN STATE_4 (A KNOWN POSITION).

< MOTOR _ REVERSE >

MOTOR ROUTINES

< MOTOR _ 8TURN_FWD >

< MOTOR _ 8TURN_REV >

MOTOR ROUTINES

< MOTOR _ PUSH _ IN >

< MOTOR _ PUSH _ IN _ CLOSE >

HIGH-LEVEL SUBROUTINES

< SLEEP TIMER >

"W" - IS THE VALUE IN THE WORKING REGISTER PRIOR TO THE SUBROUTINE CALL. IT REPRESENTS THE NUMBER OF HALF - MINUTES THE SLEEP-TIMER IS TO RUN FOR.

HIGH-LEVEL SUBROUTINES

< INITIALIZATION >

HIGH-LEVEL SUBROUTINES

FIG. 26

LIGHTNING ELECTROMAGNETIC PULSE (LEMP) DETECTOR AND ISOLATION DEVICE

CROSS-REFERENCE TO RELATED APPLICATION

This application claims the benefit of U.S. Provisional Application No. 61/990,889 filed on May 9, 2014, which is incorporated herein by reference in its entirety.

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

Modern electronic and electrically powered equipment are very susceptible to damage from transient line events such as power surges. These power surges can be caused by power grid loss, local transformer breakdown, switching surges and load inducing events. Typically, the most damaging high intensity power surges are those caused by lightning strikes during a storm, whether in the form of direct strikes to a power grid or as a result of the electromagnetic field of nearby strikes. Conventional devices to protect equipment from damage from surges include fuses, circuit breakers and surge suppressor devices. These devices react to the power surge event, itself, in that the protective action is not initiated until the power surge or spike reaches the device. Further, these devices are typically inadequate in protecting highly sensitive electronic equipment from the intense power level of a lightning strike. In such a scenario, the electronic equipment can already be damaged before the surge suppressor device can react.

In addition, prior attempted devices and methods have incorporated using radio frequency signals to detect lighting flashes received on typical amplitude modification (AM) radio receivers. However, these supposed lightning detecting AM receivers are subject to interference and cannot discriminate as to the source of the interference. Hence, they do not provide a reliable indication as to the source of the interference, proximity of the lightning, duration of the lightning, or eliminating a false detection. Further, such devices do not provide a method or device for automatically disconnecting power and absolutely isolating electrical equipment in anticipation of a storm, thereby providing a sufficient air gap from the leads of the equipment to the mains and ground earth.

Hence, what is needed is a LEMP storm detector and safety prevention device that can detect storms several miles away, detect and prevent ambient noises/interferences from false LEMP detection, detect the proximity and duration of a storm, and automatically absolutely isolate and disconnect power to electrical equipment upon detection of an approaching storm, providing a sufficient air gap between the leads of the electrical equipment and mains, having an internal battery storage, and automatically reconnecting the leads of electrical equipment upon cessation of the storm.

BRIEF SUMMARY

The above shortfalls of prior attempted methods and devices are overcome by one or more aspects of the present disclosure described herein. The present disclosure described herein generally relates to an advance warning lightning electromagnetic pulse (LEMP) storm detection device, system, and method for automatically protecting, disconnecting, and isolating electronic equipment in anticipation of a potential storm, thereby preventing damage to electronics susceptible to power surges caused by lightning strikes or earth ground fault events.

In one aspect of the present disclosure described herein, a lightning detection and electrical device protection apparatus is provided having a housing, a coaxial isolation switch, a radio receiver, a controller having a processor, wherein the controller further comprises an isolation detection unit, a drive member or drive motor, one or more input electrical contacts, one or more output electrical contacts engaged with the input electrical contacts, and wherein in response to the radio receiver detecting one or more lightning strikes, the controller operates the drive member or drive motor to disengage the input electrical contacts and output electrical contacts from each other. In addition, the radio receiver can be tuned to a frequency for detecting one or more lightning strikes. The output electrical contacts are coupled to a sliding carrier and wherein the carrier is driven by the drive member. Also, the drive member or drive motor can be further coupled to a drive gear, and wherein the drive gear further drives the carrier. The input and output electrical contacts can include hot, earth, ground, and earth sense leads. Also, the disengagement of the output electrical contacts from the input electrical contacts provide an air gap configured to prevent an electrical current jump from the output electrical contacts to the input electrical contacts. Here, the air gap can be from approximately 0.5 mm to 50 mm. Here, the isolation detection unit can determines isolation of one or more connected electronic devices from the mains, thereby not allowing a path for lightning to arc across the input and output electrical contacts. Also, the coaxial switch can disconnect an inner conductor and an outer shield of a coaxial cable to fully isolate a coaxial connection while maintaining a 50 or 75 ohm load. In addition, the lightning detection apparatus can further include a rechargeable battery source.

In another aspect of the disclosure described herein, a method of detecting lightning and protecting electrical devices is provided. The method can include detecting the presence of one or more lightning strikes, wherein the detecting is performed by one or more radio frequency tuners tuned to one or more frequency ranges of lightning or electromagnetic pulses, automatically decoupling electrical contact leads of an output port from the electrical contact leads of an input power port, automatically decoupling a coaxial input lead from a coaxial output lead. Here, the decoupling can further include a motor initiated by a controller to move a carrier coupled to the electrical contact leads of the output port away from the contact leads of the input port and creating an air gap between the input port contacts and output port contacts, thereby preventing electrical current from passing from the input port contacts to the output port contacts. In addition, the method can include automatically detecting if an electrical signal from the input power port is grounded. Here, the decoupling operation can be performed if the detection of a lightning or electromagnetic meets a pre-defined threshold parameter, wherein the pre-defined threshold parameter can be one or more radio frequencies. Also, the recoupling operation can be performed if no lightning or electromagnetic pulses are detected for a pre-defined time period. Here, the detecting can further include detecting ambient noise from normal environment to eliminate false detection of lightning or electromagnetic pulses. Also, the detecting can include determining the proximity of the lightning or electromagnetic pulses. Further, the detecting can further include determining the estimated time of arrival of the lightning or electromagnetic pulses. Here, the air gap can be approximately 0.5 mm to 50 mm. In addition, the method can further include providing one or more notifications or alerts in response to one or more detected lightning strikes or electromagnetic pulses. Also, the method can further include detecting absolute isolation of one or more electronic equipment from mains, earth ground, and digital connections.

In another aspect of the present disclosure described herein, a method, system, and apparatus are provided for detecting and periodically checking absolute isolation of electronic equipment in anticipation of an upcoming LEMP storm or lightning event. In another aspect of the present disclosure described herein, a method, system, and apparatus are provided for absolutely isolating the apparatus from the mains, earth ground, and/or power grid. In another aspect of the present disclosure described herein, a method, system, and apparatus are provided for trickle charging batteries with a Zener diode. In another aspect of the present disclosure described herein, a method, system, and apparatus are provided for detecting lightning strike EMPs and approaching storms within a geographical area. In another aspect of the present disclosure described herein, a method, system, and apparatus are provided for detecting ambient noise from the normal environment to eliminate and/or prevent interferences and/or false detection of lightning strike EMPs and approaching storms. In another aspect of the present disclosure described herein, a method, system, and apparatus are provided to prevent the batteries from discharging below a certain safety level. In another aspect of the present disclosure described herein, a method, system, and apparatus are provided to automatically disconnect the earth ground, neutral, and hot lines from one or more electronic devices upon detection of approaching storms and/or transient line events. In another aspect of the present disclosure described herein, a method, system, and apparatus are provided to automatically reconnect the earth ground, neutral, and hot lines to an electronic device upon the end of potential storms, false detection of storms, and/or termination of a timer, among others.

In another aspect of the present disclosure described herein, a method, system, and apparatus are provided for determining and detecting false EMP lightning signatures (i.e. mechanical and man-made). In another aspect of the present disclosure described herein, a method, system, and apparatus are provided for monitoring the duration of a lightning storm. In another aspect of the present disclosure described herein, a method, system, and apparatus are provided for detecting the proximity of lightning storms. In another aspect of the present disclosure described herein, a method, system, and apparatus are provided to power a processor or controller of the apparatus when the apparatus is isolated from the mains, earth ground, and/or the power grid, thereby allowing a significant air gap between contact leads (leads of the electrical equipment and mains) and preventing voltage current jump across the air gap.

In another aspect of the present disclosure described herein, a method, system, and apparatus is provided that can automatically alert the user that electronic equipment is isolated, identify inbound lightning storms, disconnect the equipment, and reconnect the equipment once the lightning storms are at a safe distance from the apparatus. A user can insert the apparatus between the AC Power (120V/240V/ 440V), digital signals (e.g. coaxial cables (RCA), coaxial digital cables), analog signals (telephone phone line/modems) or any combination of the electronic equipment to be protected. In another aspect of the present disclosure described herein, the apparatus can incorporate a surge suppression system to protect the electronics from normal power surges and fluctuation.

In one aspect of the present disclosure described herein, the apparatus can be in a power down shipping mode to protect its batteries from discharge while the unit is in inventory, storage, transportation, and retail processing. To initialize the apparatus a user can hold down the user interface button switch to initially provide power to the unit. At this stage the microcontroller is not initialized and has no means of holding the power on. As the processor or microcomntroller is not yet initialized, there can be a delay in order to prevent start-up from an accidental tap of the user interface button switch. Hence, the user may need to hold down the switch for a predetermined period of time to commence initialization and operation of the LEMP apparatus. A green LED (visible by the user) will light signifying that the apparatus has power and the user can release the switch. The processor then checks the battery power to determine if the batteries have sufficient charge. This protects the batteries from operation at a low voltage, which could degrade the life of the batteries. If the batteries' voltage is below a set point the unit may shut down and the user can allow the unit to charge for a predetermined period of time. The user may then retry the startup and the yellow LED will stay lit after the switch is released. The processor can wait a predetermined period of time, and then an earth test is automatically carried out. The LED can turn red and the motor drives the contacts to carrier position-3 testing for isolation. Once the test is complete, the processor will drive the motor back to contact carrier position-1 mains connected. The LED may then be green (all isolated) and ready to operate or yellow signifying there is an isolation issue. An operator may have to select to clear the isolation issue, which is highly recommend or the operator could wait to clear the isolation issue and the system can operate in a degraded mode and the buzzer will beep at a predetermined interval until the isolation issue is clear.

In one aspect of the present disclosure described herein, if the device or electronic equipment to be protected is not isolated then the apparatus may turn on a yellow LED. In such a scenario, the user may then take action, such as finding wire(s) (e.g. cable TV line, antenna, etc.) that are not isolated. Here, the user can simply disconnect all the inputs to the device to be protected including the power line. The user can then start connecting the input cables such as the power cable, and press the switch consecutively a predetermined number of times. The LED may turn red while the test is being performed and at the end of the test the LED may turn green or yellow. This procedure can continue until all of the electronic devices are connected or until the yellow light comes on again. Here, this will identify the device or peripheral which is not isolated from the AC power source. The peripheral that is not isolated may need to be protected with an additional apparatus following the same procedure outlined above. Once the yellow LED turns green and the buzzer stops beeping verifying total isolation, the apparatus can then protect the electronic equipment from lightning storms. In addition, the apparatus may go into a predetermined calibration mode periodically to check the status of isolation. If the unit detects an isolation issue, then the LED can turn yellow again and an audio signal such as a beep can be generated. Here, the user may have to perform the aforementioned steps to identify which peripheral or device caused the isolation issue.

Inbound lightning storms create lightning flashes generating a broad spectrum of radio frequency disturbances with especially intense emissions in the Very Low Frequency (VLF) band. These disturbances are typically audible on amplitude modulation (AM) radio as "crackles" or "static". In another aspect of the present disclosure described herein, the apparatus can include a radio receiver tuned to a specific frequency capable of receiving such disturbances with a directional ferrite rod antenna. The antenna can be coupled with a capacitor to form a tuned resonant circuit. This tuned circuit can resonate at different amplitudes based on the distance the apparatus is from the lightning strike. Here, the further the apparatus is away from the strike the lower the amplitude and the closer to the strike the larger the amplitude. The lightning strike signal picked up by the antenna is coupled to a receiver, first stage amplified, filtered, demodulator, and then passed on to the second stage of amplification. The gain of this stage of amplification can be adjusted to allow for lightning to be detected at different distances (i.e. 1 mile to 100's of miles) from the apparatus. This can be calibrated for various types of applications and situations. The signal is then coupled to a precision rectifier that rectifies the positive-going and negative-going components of the lightning strike. The rectified signal can then be passed to a Data-Slicer that digitizes the signal and detects the threshold of the data. If the amplitude of the signal exceeds the reference value the output can go high, thereby sending a signal pulse to a processor of the LEMP apparatus. The processor can monitor the pulses and if it receives a predetermined number in a predetermined time interval it will satisfy the logic that a lightning strike has been detected. The time interval can be secondary filtering, which will filter out mechanical or man-made noise (i.e. relays, motors, switches, etc.) from falsely triggering the apparatus. The processor can then start the disconnect sequence.

In one aspect of the present disclosure described herein, the apparatus can signal that a valid lightning strike has occurred and the processor can first change the LED to red and then identify the amount of current draw, such as high or low. If an external electronic device (i.e. TV, computer, etc.) connected to the LEMP apparatus is on, then current draw may be high and the processor may turn on the audio signal (such as a beep) for a predetermined period of time. This audio signal can notify the user the system is ready to go into the lightning isolation mode. In addition, this gives the user a predetermined time interval to shut down the electronic device in use or to manually override the apparatus from going into isolation mode by holding down the user interface button switch on the apparatus for a predetermined period of time. The system can be brought out of manual mode by holding down the user interface switch for a predetermined period of time. If the user does nothing before the predetermined period of time, then the processor may initiate the isolation procedure by first activating an arc suppression relay. This relay is designed to reduce the wear on the primary contact by disconnecting the hot terminal and preventing an arc while the main contacts are moving. Here, the processor can drive the motor to carrier position-2, which closes the arc suppression relay, and disconnects Hot and Neutral on the mains, keeping the earth ground connected. If the current is high there is a safety issue identified and the system locks in that position, such as the apparatus failing. If the current is low the processor drives the motor to carrier position-4 which is the isolated state (LED blinking red).

In one aspect of the present disclosure described herein, when the apparatus is in a very low power state and the batteries are being utilized for power, the processor can be in a sleep mode for a predetermined period of time and blinking the LED red for a predetermined period of time. Once the processor wakes up it can begin monitoring the receiver pulse for identifying lightning strikes. If the processor receives a pulse within a predetermined period of time it will go back to sleep. This loop will continue until the processor wakes up and no "pulses" are identified during the predetermined window. In this scenario, the processor can drive the motor to carrier position-2, the arc suppression relay can open, and processor can drive the motor to carrier position-1, mains connected and the arc suppression relay will close connecting the hot terminal. The apparatus can then display an LED green light indicating monitoring for the next lightning strike.

In another aspect of the present disclosure described herein, there can be maintenance, cleaning, and testing programs initiated by pressing the user interface button switch. Here, a contact cleaning can be performed to keep the contacts in good operating performance. The user can press the interface button switch sequentially a predetermined number of times and the system LED can flash red while the processor is driving the motor back and forth a predetermined number of motor turns in order to clean the contacts. Once complete, the LED turns green and apparatus can be in the monitoring state. In addition, there can be a manual isolation test, operator pressing the user interface button switches sequentially for a predetermined time period and the system can perform the isolation test.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which:

FIG. 5 illustrates a perspective isometric exploded view of a coaxial isolation switch according to one non-limiting embodiment of the present disclosure described herein.

FIG. 26 illustrates Table 1 and Table 2 having values, references, and parameters corresponding to one or more of values, references, and parameters in FIGS. 27-31.

DETAILED DESCRIPTION

Figure 1A:
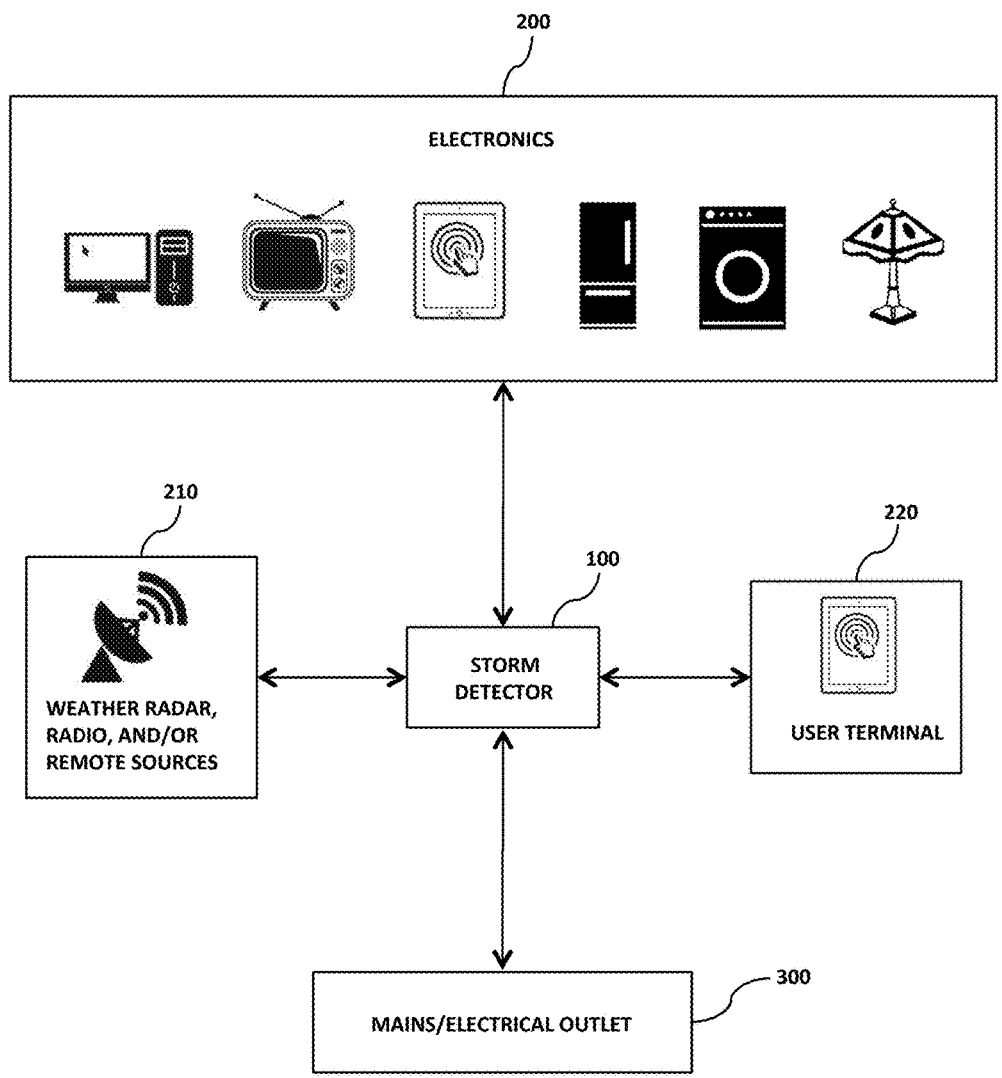
FIG. 1A illustrates a general electrical connection overview block diagram according to one non-limiting embodiment of the present disclosure described herein.

In the Brief Summary of the present disclosure above and in the Detailed Description of the Present disclosure described herein, and the claims below, and in the accompanying drawings, reference is made to particular features (including method steps) of the present disclosure described herein. It is to be understood that the disclosure of the present disclosure described herein in this specification includes all possible combinations of such particular features. For example, where a particular feature is disclosed in the context of a particular aspect or embodiment of the present disclosure described herein, or a particular claim, that feature can also be used, to the extent possible, in combination with and/or in the context of other particular aspects and embodiments of the present disclosure described herein, and in the present disclosure described herein generally.

In one implementation of the present disclosure described herein, the storm detector can be a computing device. Here, information may be stored in memory on the storm detector of the present disclosure described herein or computing device, data storage resided at the edge of a network, or on the servers at a central center. The detector, computing device or mobile device may receive non-transitory computer readable media, which may contain instructions, logic, data, or code that may be stored in persistent or temporary memory of the computing device, or may somehow affect or initiate action by a computing device. Similarly, one or more servers may communicate with one or more computing devices across a network, and may transmit computer files residing in memory. The network, for example, can include the Internet, wireless communication network, or any other network for connecting one or more computing devices to one or more servers.

Any discussion of a computing or mobile device may also apply to any type of networked device, including but not limited to phones such as cellular phones (e.g., an iPhone®, Android®, Blackberry®, or any 'smart phone'), a personal computer, iPad®, server computer, tablet, or laptop computer; personal digital assistants (PDAs) such as a Palm-based device or Windows® CE device; a roaming device, such as a network-connected roaming device; a wireless device such as a wireless email device or other device capable of communicating wirelessly with a computer network; or any other type of network device that may communicate over a network and handle electronic transactions. Any discussion of any mobile device mentioned may also apply to other devices.

On a computing device or controller, a display page may be interpreted by software residing on a memory of the device, causing the computer file to be displayed on a video display in a manner perceivable by a user. The display pages described herein may be created using a software language to create a computer file displayable on a video display or visual notification in a manner perceivable by a user. Any computer readable media with logic, code, data, instructions, may be used to implement any software or process flow or steps or methodology. Where a network comprises the Internet, a display page may comprise a webpage of a type known in the art.

Phrases and terms similar to "software", "application", "firmware", "logic", "routine", and "code" may include any non-transitory computer readable medium storing thereon a program, which when executed by a computer, causes the computer to perform a method or function.

Phrases and terms similar to "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Terms and phrases similar to "lightning" or "storm" or "strike" or "Lightning Electromagnetic Pulse" or "LEMP" or "Electromagnetic Pulse" or "EMP" can be used interchangeably throughout this disclosure and can include one or more lightning storms, lightning strikes, thunderstorms, tropical storms, and environmental conditions causing lightning or severe weather such as rain, hail, wind, tornados, and/or hurricane.

Terms and phrases similar to "lead", "leads", or "contact leads" can be used to describe one or more electrical connections to or from an electrical device, component, AC, DC, digital, or analog circuit.

FIG. 1A illustrates an example overview diagram of a storm detector according to one embodiment of the present disclosure described herein. Here, one end of storm detector 100 can be coupled or connected to mains, power grid, power source, or electrical socket or outlet 300, such as a 110V, 120V, 220V, and/or 240V electrical outlet. In other embodiments, detector 100 can be fixed within a wall of a home or commercial building and directly coupled to the building mains, power grid, and/or power source. Another end of detector 100 can be coupled or connected to one or more electrical devices, electrically operated apparatuses, and electronics 200, including but not limited to: computing devices, television sets, receivers, multimedia equipment, video and audio equipment, refrigerators, stove, washing/drying machines, lights, among others. Here, detector 100 can be a stand-alone apparatus or integrated with one or more electronics. In addition, it is contemplated within the scope of the present disclosure described herein that any number of electronics can be electrically coupled to detector 100, wherein detector 100 can also function as a hub for multiple devices. In addition, a surge suppressor can also be integrated with detector 100 or placed between detector 100 and electronics 200 and/or between detector 100 and outlet 300. Further, the detector can also be coupled to one of more digital or analog signals (e.g. coaxial cables (RCA), coaxial digital cables, telephone lines, modems, and the like)

Still referring to FIG. 1A, device 100 can also communicate bi-directionally in a wired or wireless network with one or more remote servers or sources 210 and one or more user terminals 220. For example, sources 210 can include, but is not limited to servers, databases, third party data, radars, Doppler radar, satellites, radios, television, weather stations and radars such as NEXRAD and TDWR, among others. User terminals 220 can include any type of computing device, wherein one or more users can program, communicate, transmit, and/or receive data from detector 100, such as notifications, alerts, status, and/or advertising. For example, user terminal 220 can be a mobile device and having a dedicated application, software, or program that communicates, sends, and receives data from detector 100.

Figure 1B:
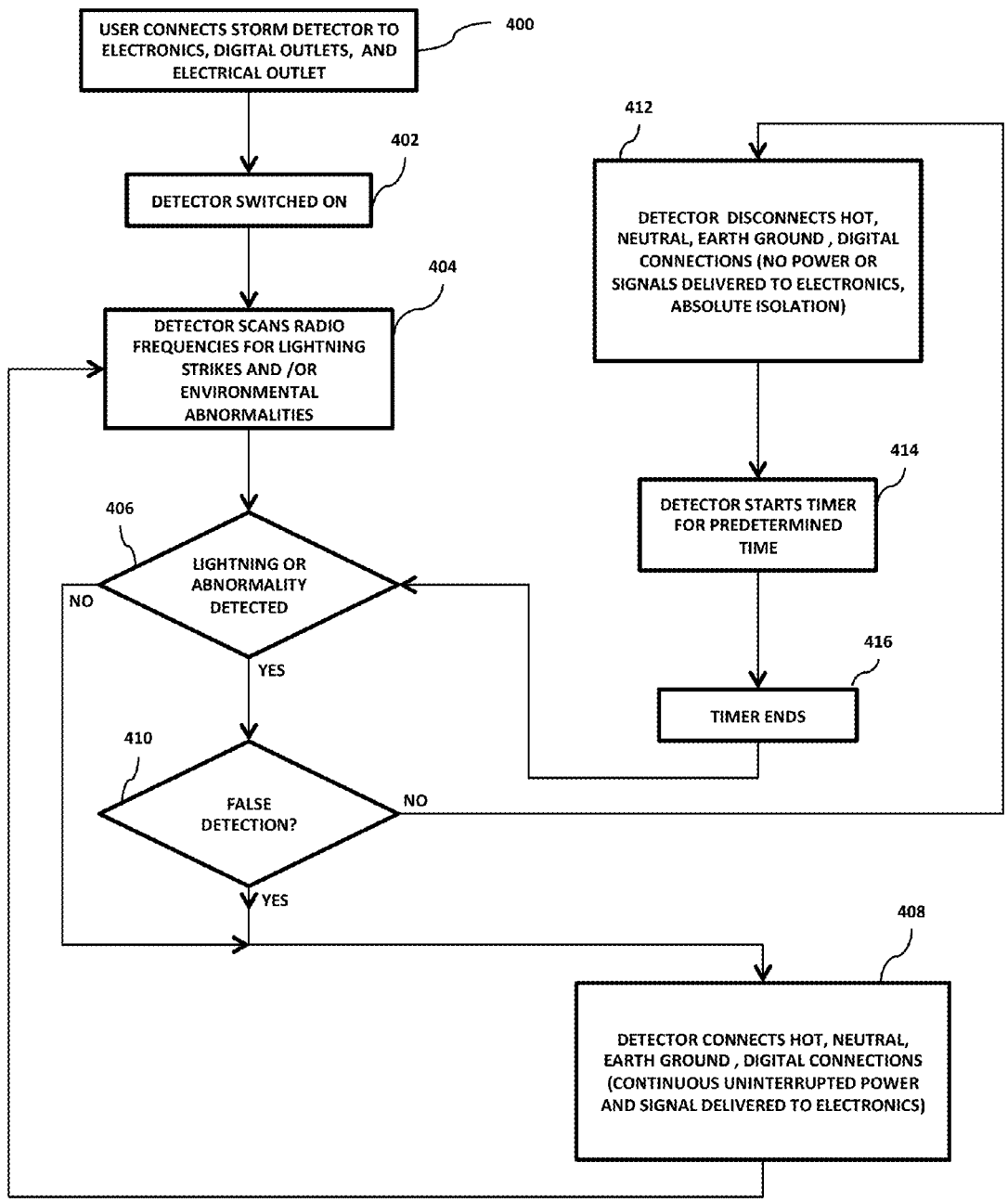
FIG. 1B illustrates a general workflow or flowchart of a method of operation according to one non-limiting embodiment of the present disclosure described herein.

FIG. 1B illustrates a general workflow or flowchart of a method of operation according to one non-limiting embodiment of the present disclosure described herein. Here, at step 400 one or more users can connect the storm detector to one or more electronics and one or more electrical outlets. At step 402, the detector can be switched on automatically or via a switch. In addition, the process validates isolation and indicates the isolation with either an audio or visual signal, such as an LED pass or fail. Here, this validation of isolation will periodically be checked on a random basis to make sure the system's isolated status is known. At step 404 the detector can scan, sense, or watch a range of radio frequencies, such as in the AM band, generally ranging from 535 kHz to 1605 kHz, and/or in the FM band, generally ranging from 88 MHz to 108 MHz Further, it is contemplated within the scope of the present disclosure described herein that a detector radio could also be provided in order to receive electromagnetic pulses from less than 3 kHz to 300 GHz. In addition, it is contemplated within the scope of the present disclosure described herein that the detector can also scan, sense, detect, or watch for alterations, discrepancies, or fluctuations in current within an electrical line. Furthermore, the detector can be equipped with environmental sensors, such as temperature, humidity, and wind and further communicate bi-directionally in a network with one or more weather radars (i.e. NEXRAD, TWDR) and/or remote servers and databases. At step 406, if no lightning, approaching storms, or an abnormality with the radio frequencies (RF), radar data, and/or electrical line/load (among others) is detected by the detector, then process can proceed to step 408, wherein the detector automatically connects via an internal motor (such as rotary or linear motor, actuator, spring, relay, or magnetic system) the hot, earth ground, and neutral leads of the electrical outlet with the hot, earth ground, and neutral leads of the electronic components, thereby providing continuous and uninterrupted power to the electronics. In addition, at step 408, the detector can trickle charge one or more internal rechargeable batteries that can operate the detector for several hours and months in the event that there is no external electrical power to the detector (such as from an electrical outlet). In addition, the batteries can be used to monitor the storm, keep the processor powered up, and isolate from the mains while the detector is disconnected from the mains. In one embodiment, the batteries can back up the detector for greater than 8 hours should a storm knock out power.

Still referring to step 406, if the detector detects lightning, approaching storms, or an abnormality with the radio frequencies (RF), radar data, electrical line/load (among others), then the process can proceed to step 410. At step 410, the detector can check to determine if the abnormality is false or positive (true) detection. Here, the detector can use one or more algorithms, software, and/or logic to determine if a spike, fluctuation, or abnormality in a given RF band, electrical line/load, radar data (among others) meets a certain threshold that would categorize the abnormality as lightning, potential or approaching storm, duration of the storm, proximity/location of the storm, speed of the storm, estimated time of arrival (ETA) of the storm, type of storm, intensity of the storm, among others. In addition, the detector can have one or more filters, logic, algorithms, and methods for eliminating, compensating, and/or reducing background, electromagnetic field (EMF), or environmental noises, conditions, and interferences. Still referring to step 410, if a false detection is determined, then the process can proceed to previously discussed step 408. However, if no false detection is determined, then the process can proceed to step 412.

At step 412, the detector can automatically and immediately disconnect (via commands from an internal process and a stepper motor) all hot, earth ground, and neutral leads associated and connected to electronic components from all corresponding hot, earth ground, and neutral leads associated and connected to the electrical outlet. Here, the disconnect of the electronic leads from the electrical outlet leads can have an air gap ranging from 0.5 mm to 50 mm that can prevent an electrical current jump across the leads resulting from lightning strike, power surge, and/or earth ground fault, such as up to a million Volts. In addition, at step 412, the detector can begin to operate off of its own one or more internal battery storage units. At step 414, the processor or controller of the detector can start a predetermined or predefined timer that will keep the detector in disconnect mode from the electrical outlet. It is contemplated within the scope of the present disclosure described herein that the processor can be any type of controller or computing device. Here, either the user or the manufacturer of the detector can program the timer and the predefined time. In addition, the detector can still operate in "live" mode continuing to monitor or scan an approaching or existing storm, RF fluctuation/abnormality, radar data or line abnormalities. Further, the detector can transmit any notifications or an alert to a user's computing device previously synced or registered with the detector. At step 416, once the timer has completed or a cessation of an approaching storm has been determined, the process can proceed back to step 406, and subsequently step 408. At step 408, the detector (via the processor and motor) will automatically connect or re-connect the hot, earth ground, and neutral leads associated with the electronic components with the corresponding, hot, earth ground, and neutral leads associated with the electrical outlet or power grid in order to resume continuous uninterrupted power to the electronic components.

Figure 2:
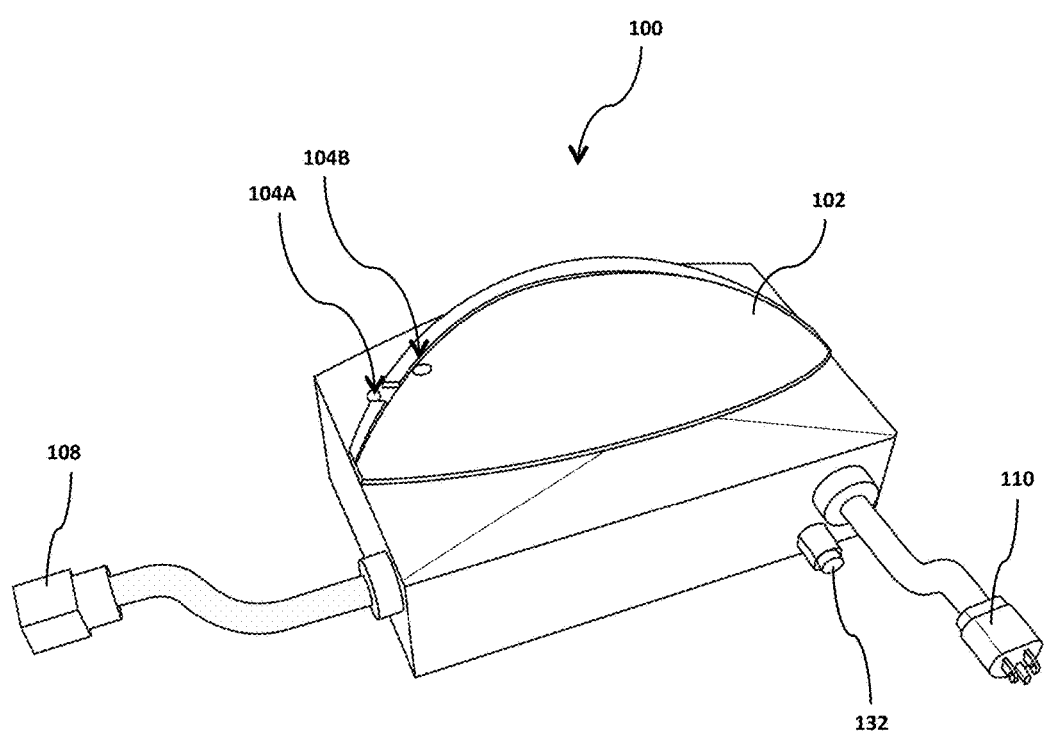
FIG. 2 illustrates a perspective isometric view according to one non-limiting embodiment of the present disclosure described herein.

FIG. 2 illustrates a perspective isometric view of one embodiment of the storm detector 100 of the present disclosure described herein. In this embodiment, storm detector 100 is illustrated as a stand-alone apparatus. Detector 100 can include housing 102 that houses electrical and mechanical parts, push rod switch 104A physical user interface to actuate a switch 122A on control circuit board 122 and provide double insulation barrier for electrical safety, and wherein the switch 122A can be a user interface for various modes of operation such as on/off, standby, programming, isolation self test, among others. In addition, LED light pipe 104B can provide a visual indication for modes of operation such as either when the detector is turned on, off, in disconnect mode, and or the status of the device switch 122A for user interface (e.g. On/off, standby, programming, isolation self test, etc.) of detector 100, and female electrical socket 108 for connecting to one or more electronic components and male socket 110 for connecting to one or more electrical outlets. Resetable fuse 132 used to protect the wiring and electrical equipment between the main and detector 100. In addition, control board 122 further includes a radio receiver 122B.

Figure 3:
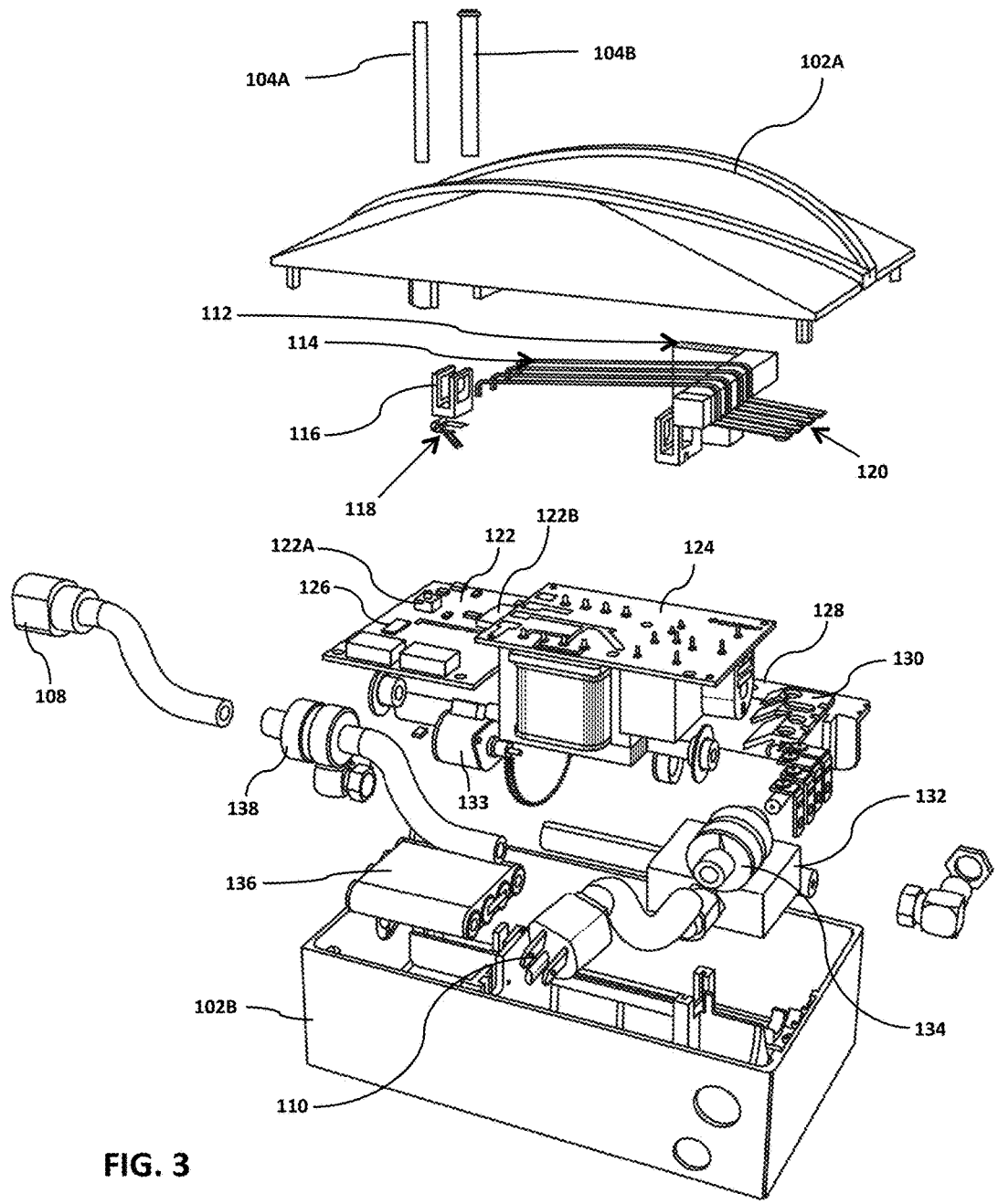
FIG. 3 illustrates an elevated perspective isometric exploded view according to one non-limiting embodiment of the present disclosure described herein.
Figure 4:
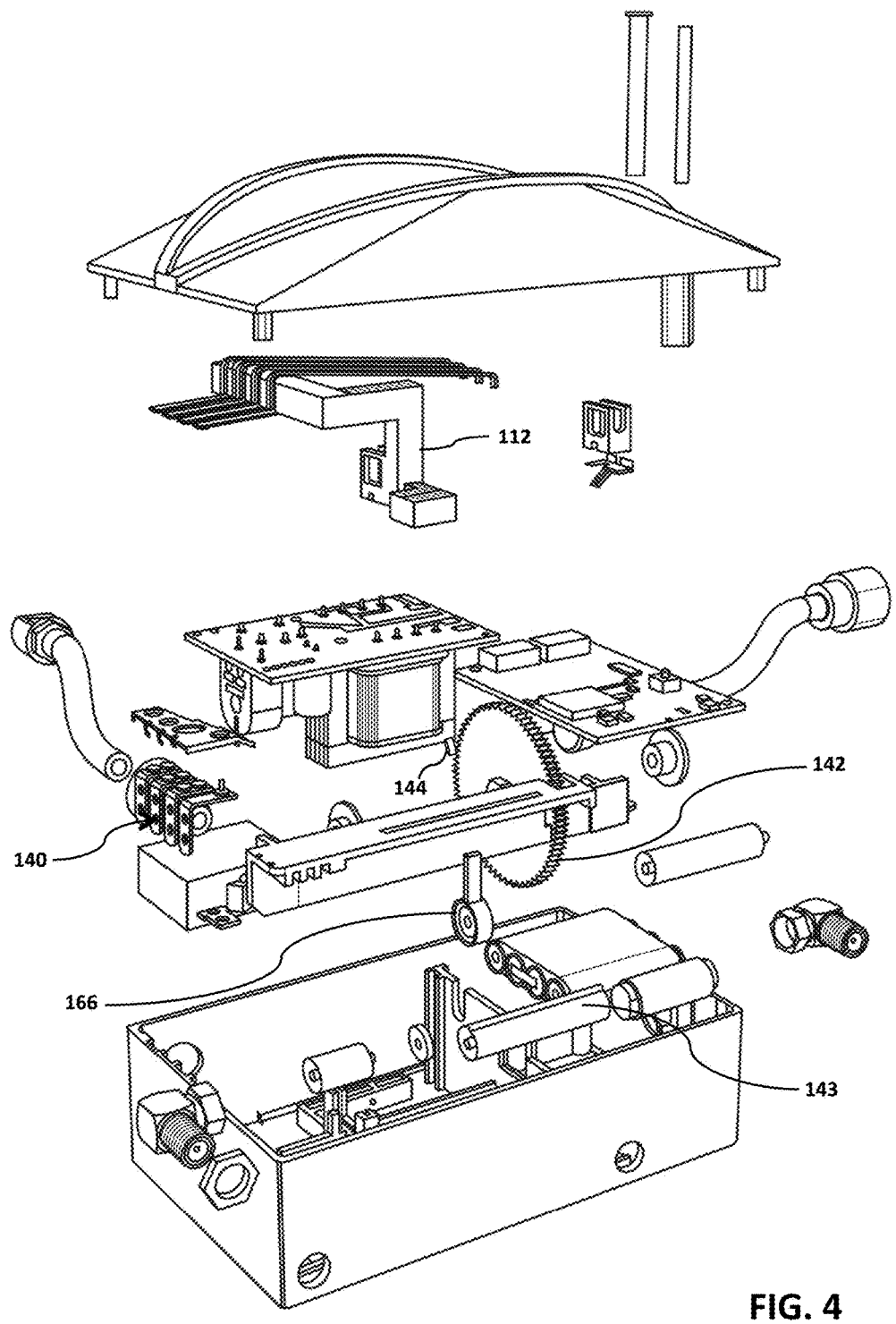
FIG. 4 illustrates another elevated perspective isometric exploded view according to one non-limiting embodiment of FIG. 3.

FIGS. 3-4 illustrate elevated perspective exploded side views of the internal parts of the storm detector 100 and the interrelationship between such parts, according to one embodiment of the present disclosure described herein. Referring to FIGS. 3-4, detector 100 can include a first top shell 102A forming a dome (such as a stadium dome), bottom shell 102B, 120 Volt contact carrier arm 112, 120 Volt Braided Cable Assembly 114, Motor Position Carrier 116, Motor Position 5 VDCS Spring Contacts 118, 120 Volt Contacts Hot, Neutral, Earth, and Sense 120, Processor or microcontroller 126 on control board 122, wherein the processor can also be an ASIC, FPGA integrated circuit, discrete logic component, and the like. In addition, the LEMP apparatus can further include a PCB Transformer Relay 124, 10 Amp Fuse Resettable 132, Coaxial Cover 128, 120 Volt Contact Retainer 130, Drive Motor 133, 120 Volt Grommet Wall Outlet 134 and 138, Battery 4-AAA NiMH Pack 136, 120 Volt Grommet and Cable Isolator 138, 120 Volt Contacts Hot, Neutral, Earth, and Sense leads 140, Drive Transfer Gear (100 Teeth) 142, and Coaxial Isolation Switch 143, and Drive Gear 144. However, it is contemplated within the scope of the present disclosure described herein that any one or more of the aforementioned parts can be replaced, removed, and/or additional parts or components added to the detector. It is contemplated within the scope of the present disclosure described herein that any reference to one or more 120 Volt components can also include from 100 Volts up to and including 240 Volt components.

FIG. 5 illustrates an elevated perspective exploded view of the internal parts of coaxial isolation switch 143 and the interrelationship between such parts, according to one embodiment of the present disclosure described herein. In one embodiment, the coaxial cable isolation switch can feed through and/or isolate one or more digital signal traveling through the LEMP apparatus, wherein the digital input signals to the LEMP apparatus or output signals from the LEMP apparatus can come from or be connected to a variety of external devices, such as wall mounted coaxial outlets, cable TV systems, set-top boxes, internet/LAN cables, and the like. In one embodiment, there can be an inbound or input coaxial cable connector for connecting the switch 143 receiving input signals/data/packets from the outside world, such as cable/internet/signal provider, and an output or outbound coaxial cable sending the received signals and data to one or more electronic devices, such as TV, set top boxes, routers, and the like. Referring to FIG. 5, the coaxial cable 143 construction includes a ground conductor (outer shield), such as outer shields 154, 158, and 160, and center conductors that carry and transmit the received data, packets, or signals, such as conductors 152, 170, and 172, shown engaged with each other in FIG. 5D. Here, RF switches can operate to switch the center conductor, wherein the ground stays connected.

Figure 5A:
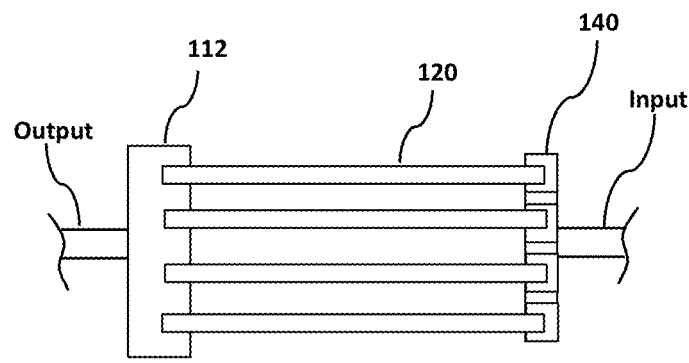
FIGS. 5A-5C illustrate a simplified top view for one embodiment of an operation of the electrical contacts of the apparatus and present disclosure described herein.
Figure 5B:
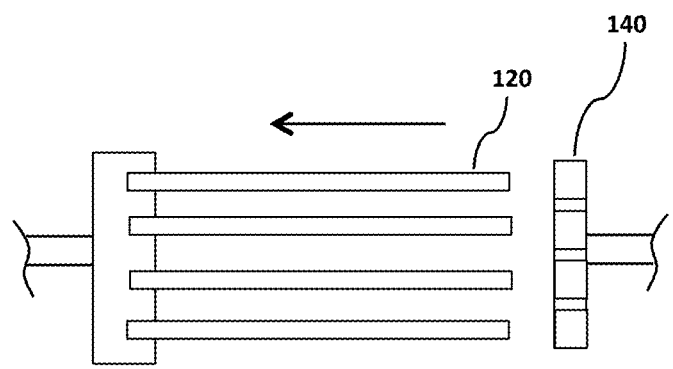
Figure 5C:
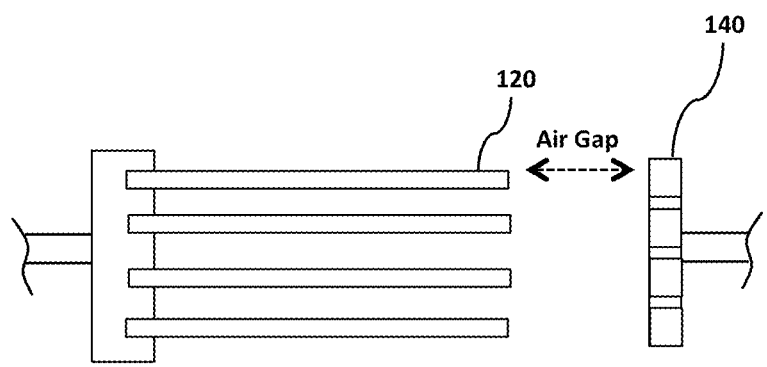
Figure 5D:
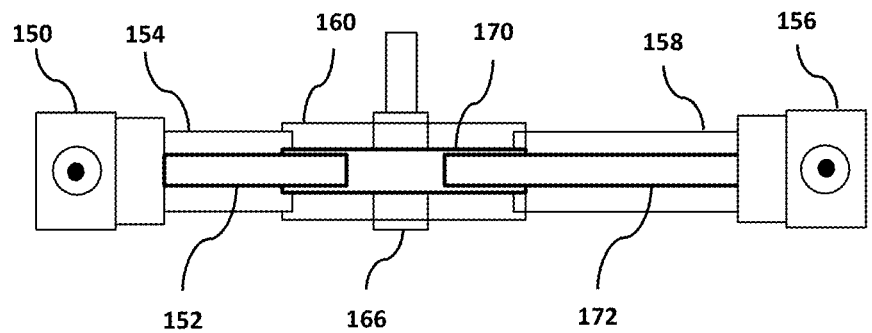
FIGS. 5D-5F illustrates simplified cross-sectional side view for one or more embodiments of an operation of the coaxial isolation switch of the apparatus and present disclosure described herein.
Figure 5E:
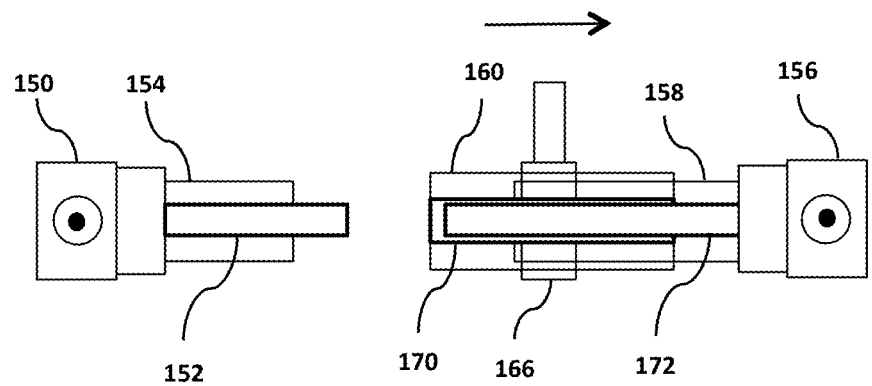
Figure 5F:
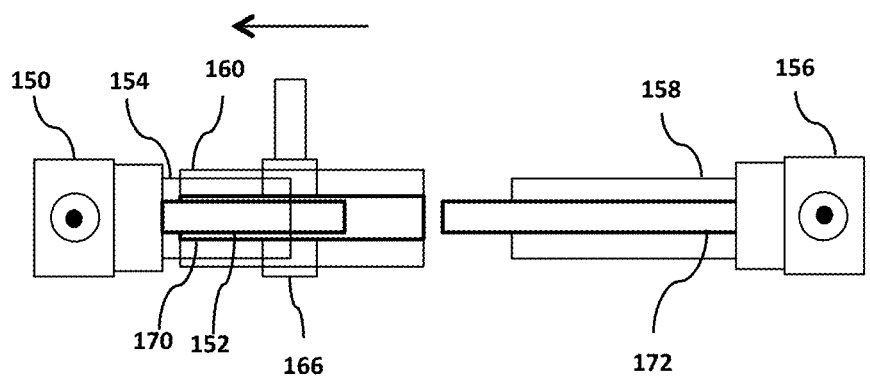

Referring to FIG. 5 and simplified operation diagrams of FIGS. 5D-5F, in order for the switch 143 to isolate the received input and output signals and earth ground, carrier 112 is engaged or coupled to slide lever 166, wherein carrier 112 slides lever 166 in a left (FIG. 5F) or right (FIG. 5E) direction, thereby disconnecting the center conductors 170/172 from conductor 152, and further disconnecting ground outer shields 160/158 from ground outer shield 154, as shown in FIGS. 5E and 5F. Here, ground shield 160 is configured to at least partially slide over shields 158 and 154. Further, conductor 170 is configured to slide over conductors 172 and 152. In addition, slide lever 166 is coupled to shield 160 and conductor 170, and collectively move with respect to parts 150, 152, 154, 156, 158, and 172 to couple thereto or decouple therefrom, wherein parts 150, 152, 156, 158, and 172 are fixed to the housing 102B. Specifically, switch 143 can include Adaptor F Male-Female R/A 75 Ohms Mains Side 150, Inner Conductor 0.723" 152, 1032 Threaded Rod #1 154, Adaptor F Male-Female R/A 75 Ohm Isolated Side 156, 1032 Threaded Rod #2 158, Outer Shield Slide 160, 1032 Threaded Nut 162, Inner Dielectric Fixed 0.075" 164, Slide Lever 166, Inner Dielectric Disc Fixed 0.200" 168, Slide Inner Conductor 1.712" 170, Inner Conductor 1.745" 172, and 1032 Threaded Nut 174. However, it is contemplated within the scope of the present disclosure described herein that any one or more of the aforementioned parts can be replaced, removed, and/or additional parts or components added to the detector.

Here, as illustrated in FIGS. 5A-5B in a simplified diagram, in operation, the carrier 112 can be driven by the drive motor to disengage the output electrical contact leads 120 from the input electrical contact leads 140, thereby creating an air gap between the contacts 120 and 140. Here, leads 120 are coupled to outlet or output plug 108 and contacts 140 are coupled to input or inlet plug 110 for receiving electrical current and power from the mains. It is contemplated within the scope of the invention that the carrier may also move to the left or right direction for coupling and decoupling the input and output leads.

FIGS. 6-25 illustrate various embodiments of routines, algorithms, logic, processes, method, workflow, and flow chart for a processor, controller, or computing device of the LEMP detector of the present disclosure described herein.

Figure 6:
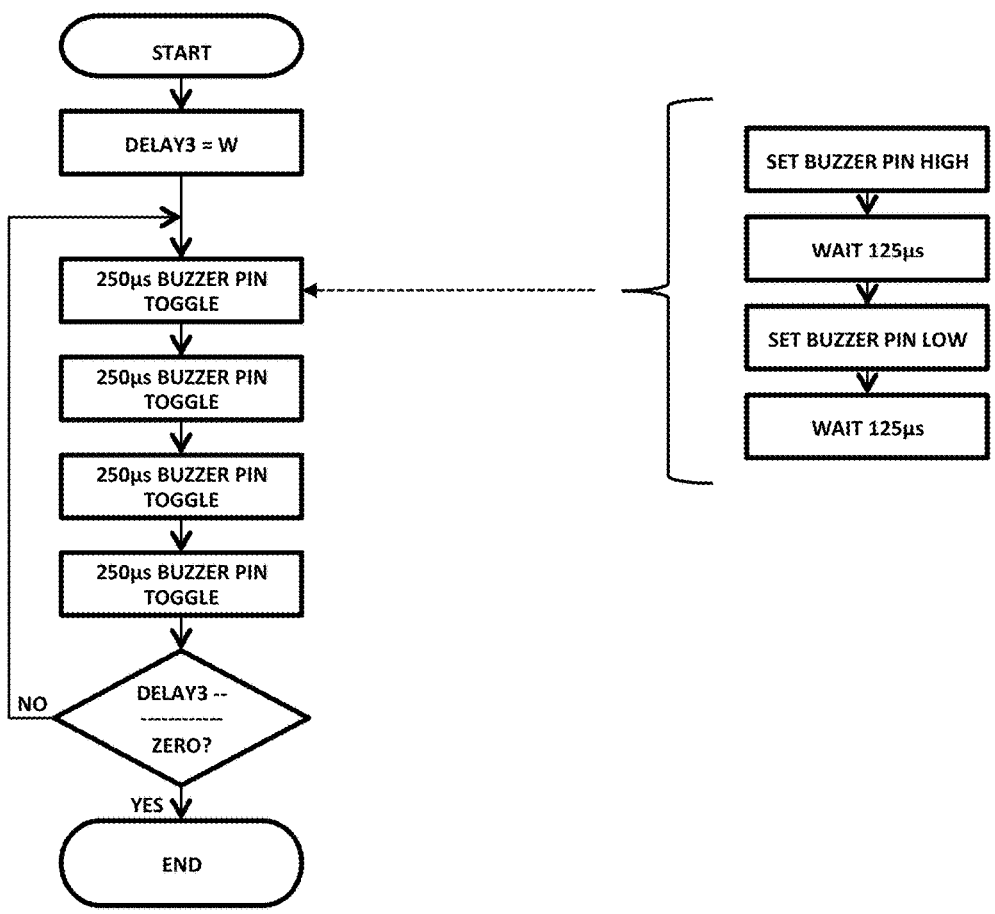
FIG. 6 illustrates an example low level subroutine process workflow or flow chart according to one non-limiting embodiment of the present disclosure described herein.
Figure 7:
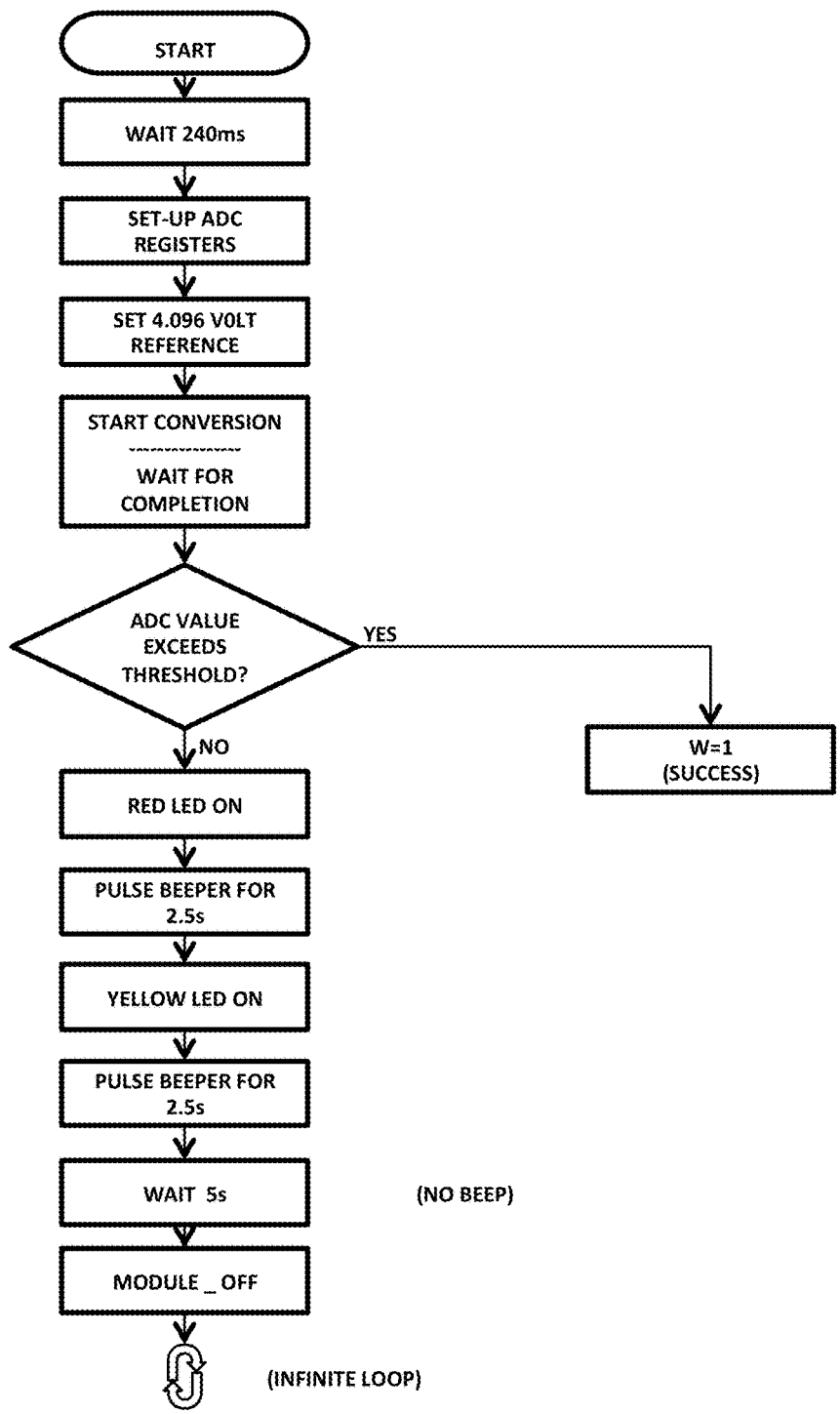
FIG. 7 illustrates an example ADC (Analog to Digital Converter) battery sense routine process workflow or flow chart according to one non-limiting embodiment of the present disclosure described herein.
Figure 8:
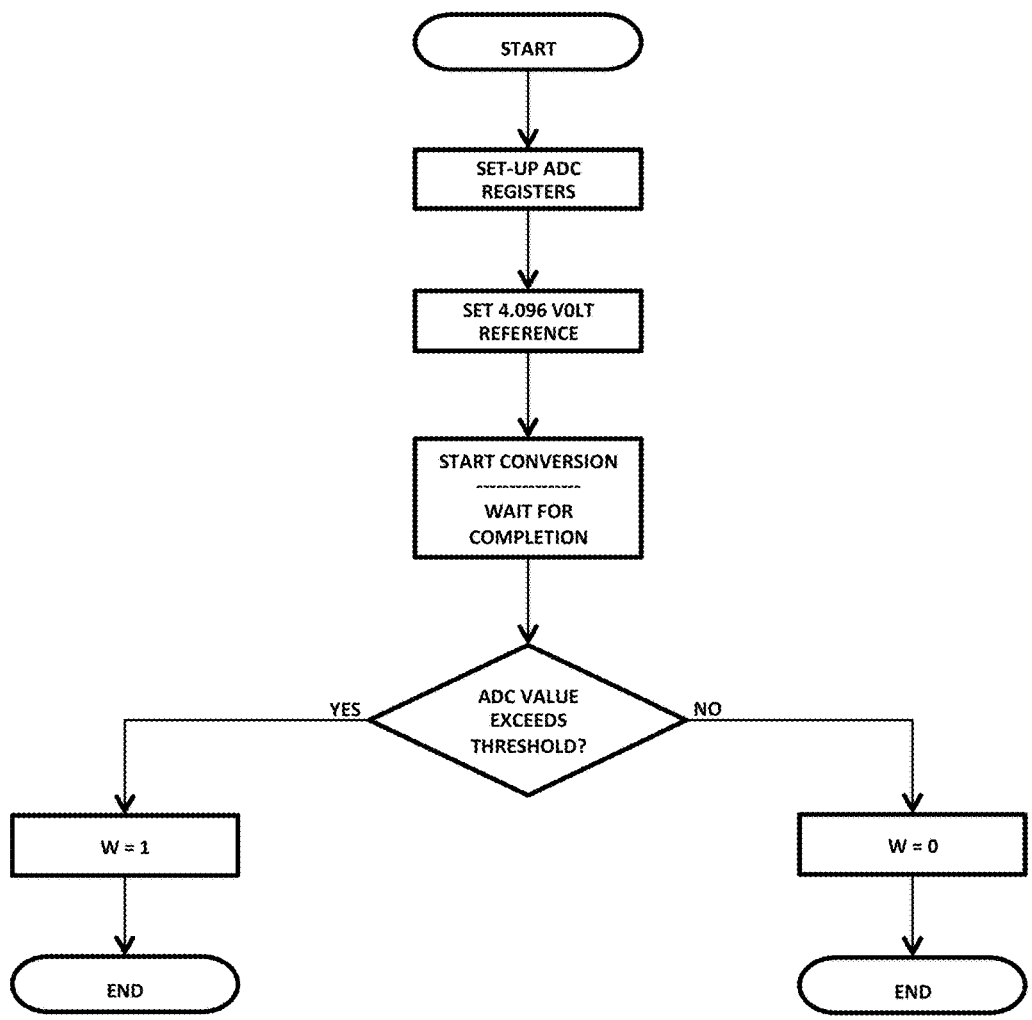
FIG. 8 illustrates an example ADC current sense routine process workflow or flow chart according to one non-limiting embodiment of the present disclosure described herein.
Figure 8A:
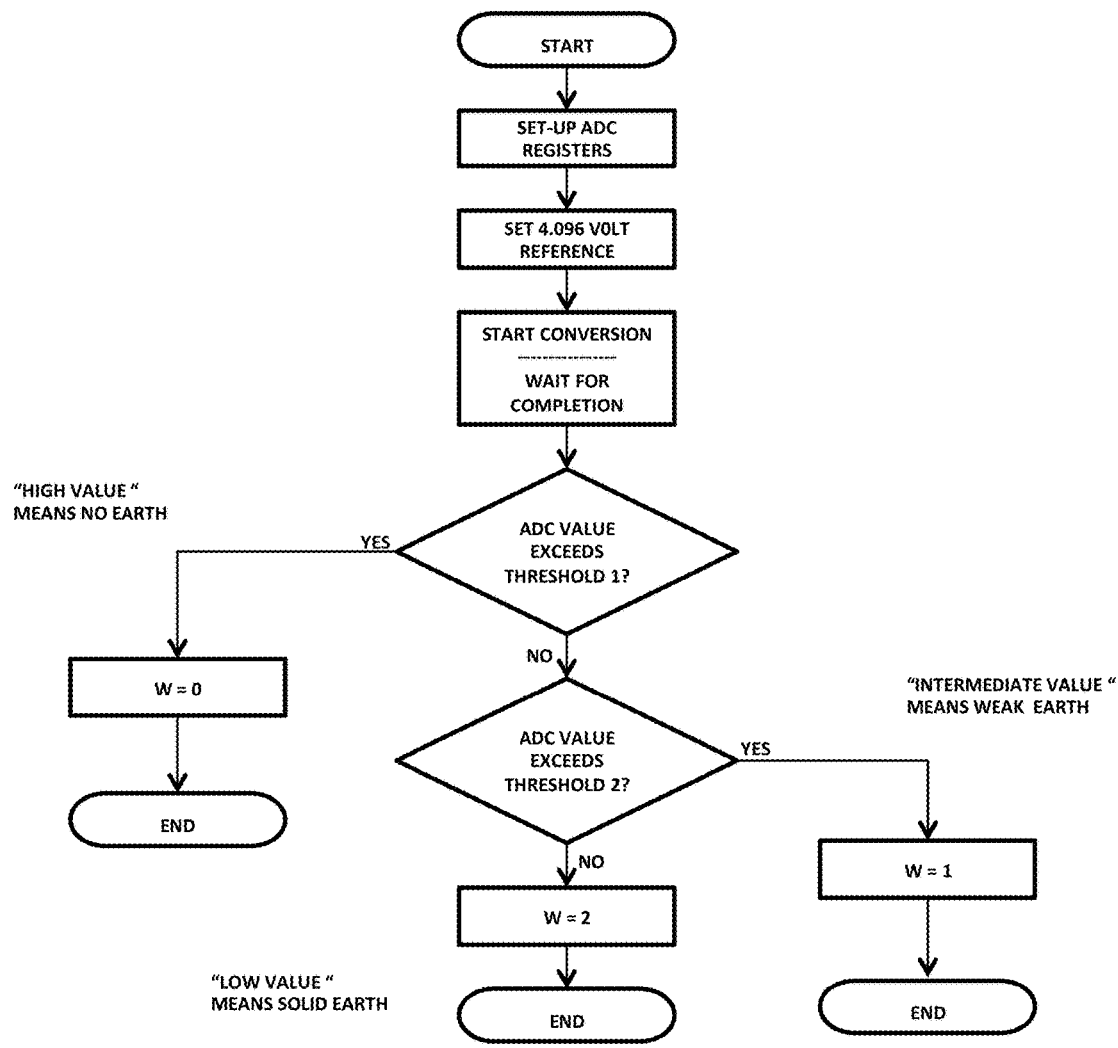
FIG. 8A illustrates an example ADC earth sense routine process flow or flow chart according to one non-limiting embodiment of the present disclosure described herein.
Figure 9:
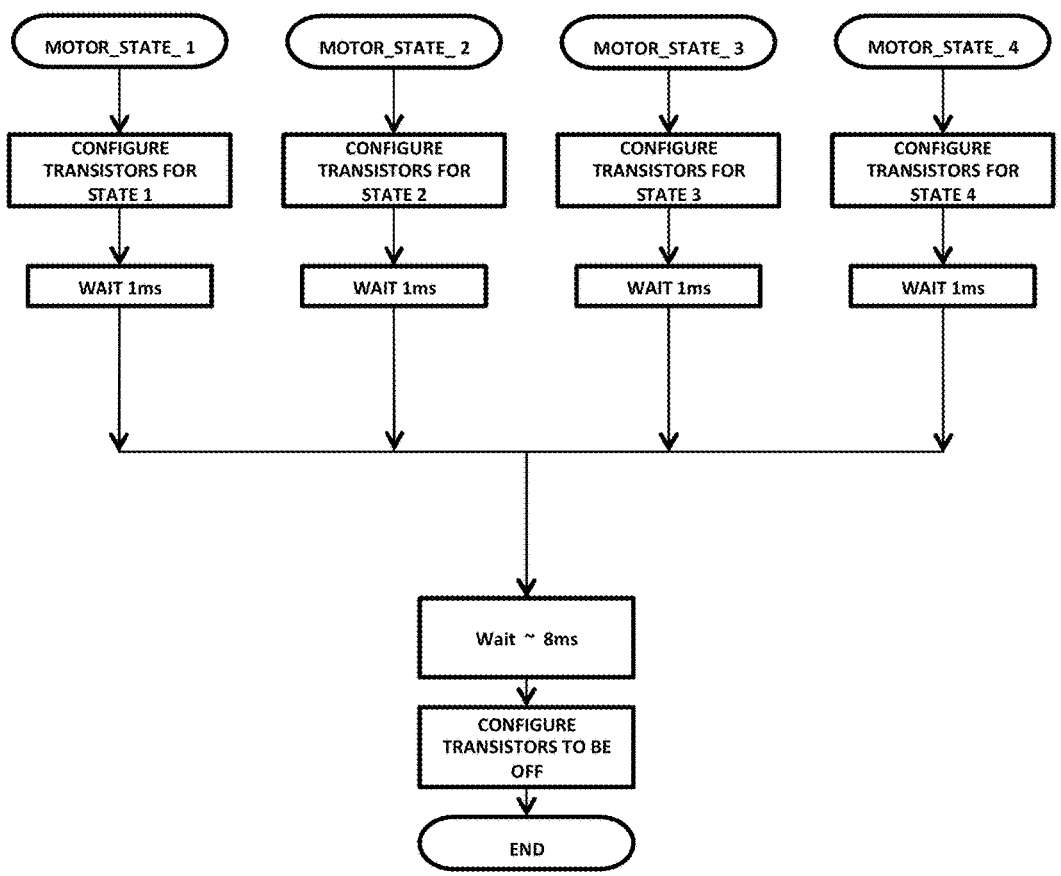
FIG. 9 illustrates an example motor routine workflows or flow charts, such as motor state, motor forward, and motor reverse, according to one or more non-limiting embodiments of the present disclosure described herein.
Figure 9A:
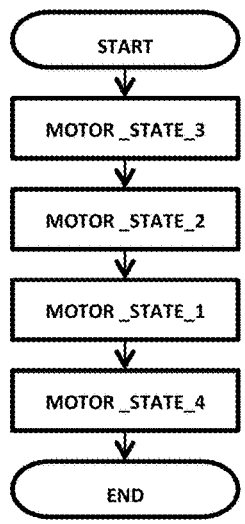
FIG. 9A illustrates an example drive motor forward and drive motor reverse process or flow chart according to one non-limiting embodiment of the present disclosure described herein.
Figure 9A:
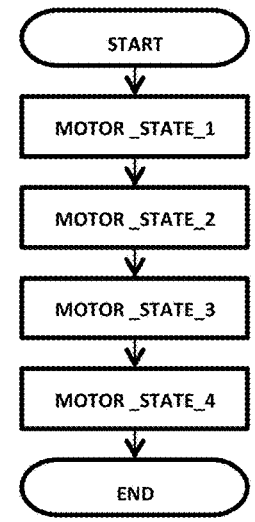
Figure 10:
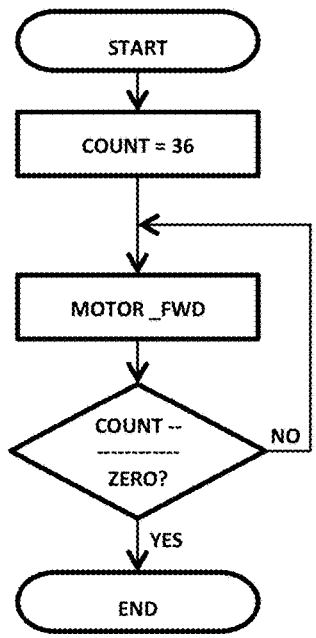
FIG. 10 illustrates an example motor turn forward routine process workflow or flow chart according to one non-limiting embodiment of the present disclosure described herein.
Figure 11:
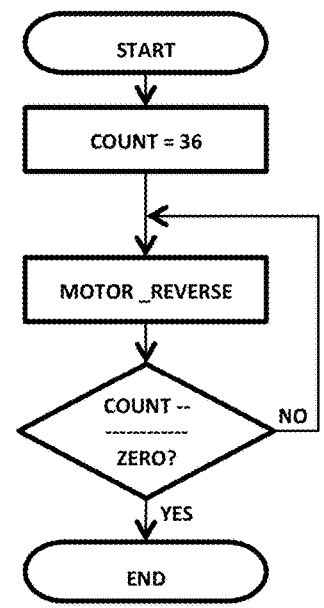
FIG. 11 illustrates an example motor turn reverse routine process workflow or flow chart according to one non-limiting embodiment of the present disclosure described herein.
Figure 12:
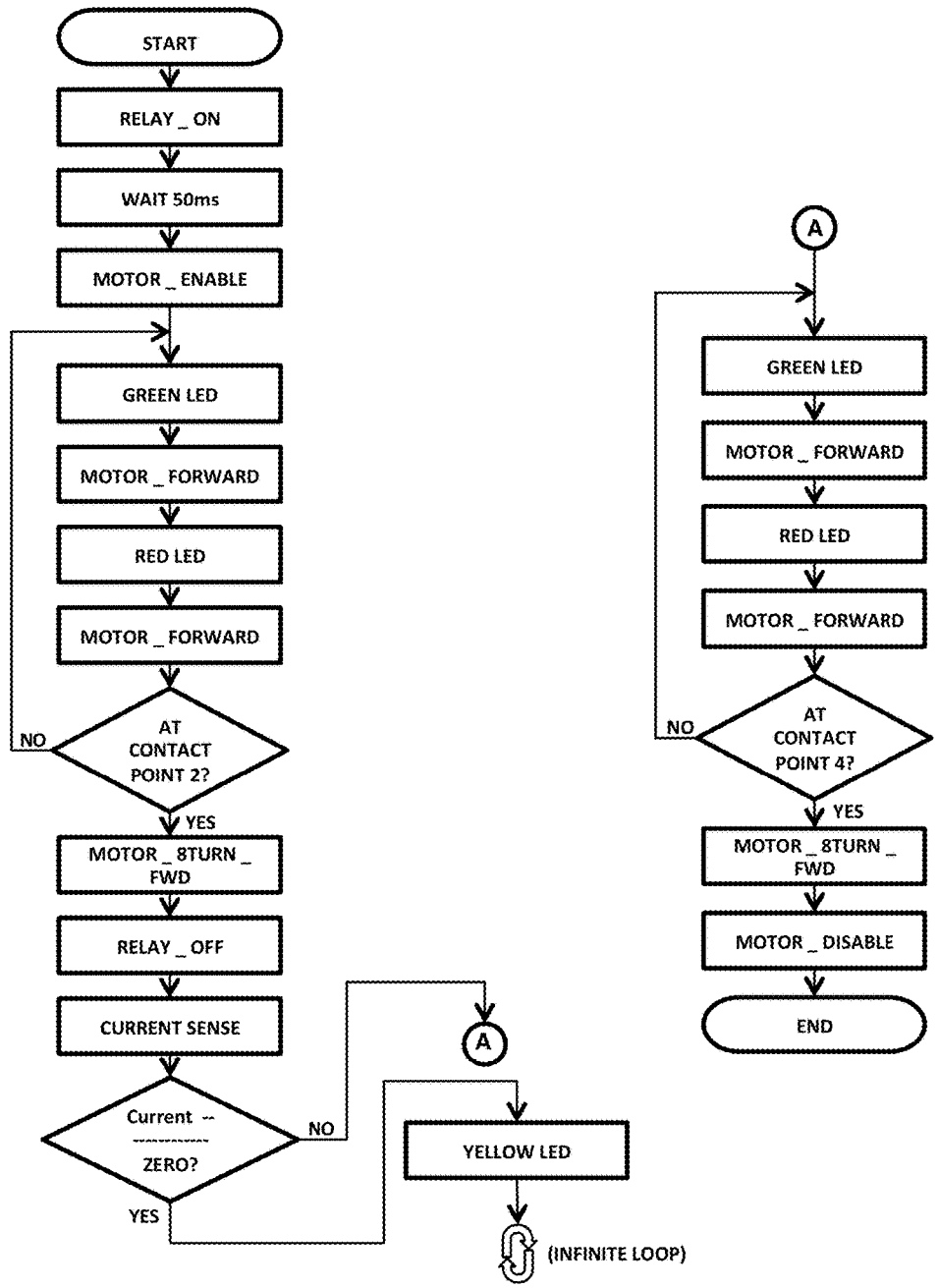
FIG. 12 illustrates an example motor pullout routine process workflow or flow chart according to one non-limiting embodiment of the present disclosure described herein.
Figure 13:
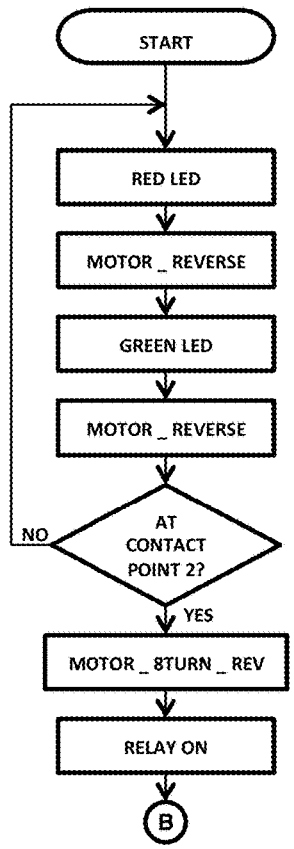
FIG. 13 illustrates an example motor push in routine process workflow or flow chart according to one non-limiting embodiment of the present disclosure described herein.
Figure 14:
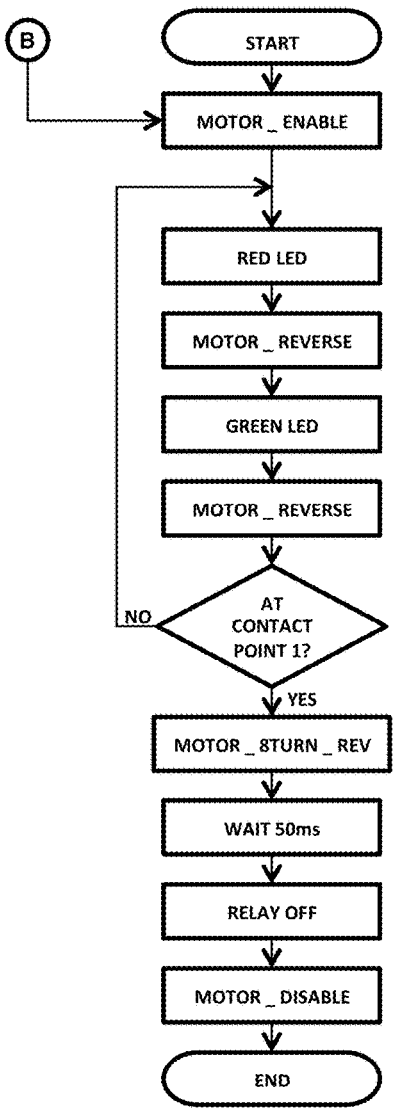
FIG. 14 illustrates an example motor push in close routine process workflow or flow chart according to one non-limiting embodiment of the present disclosure described herein.
Figure 15:
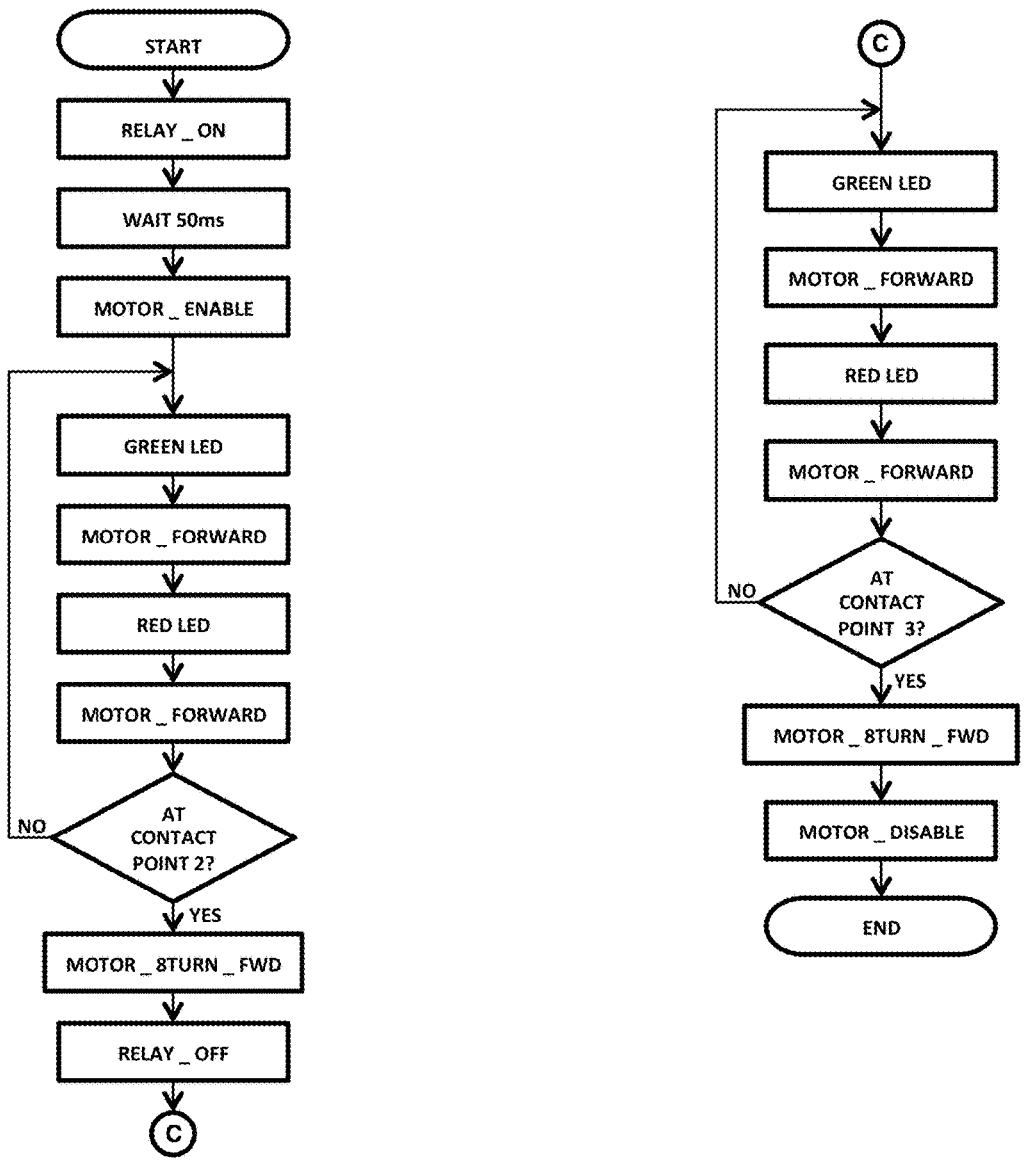
FIG. 15 illustrates an example motor pull to earth test routine process workflow or flow chart according to one non-limiting embodiment of the present disclosure described herein.
Figure 16:
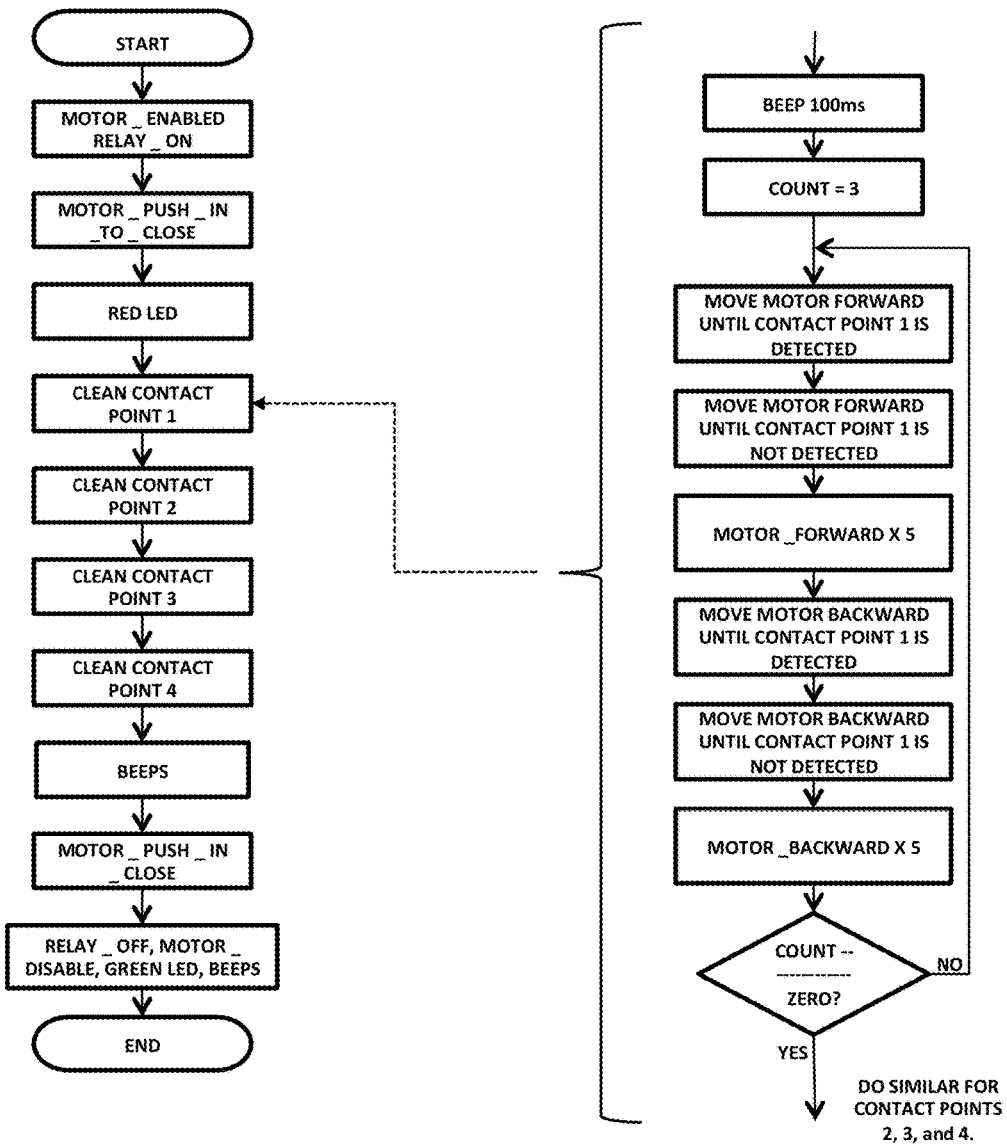
FIG. 16 illustrates an example contact cleaner routine process workflow or flow chart according to one non-limiting embodiment of the present disclosure described herein.
Figure 17:
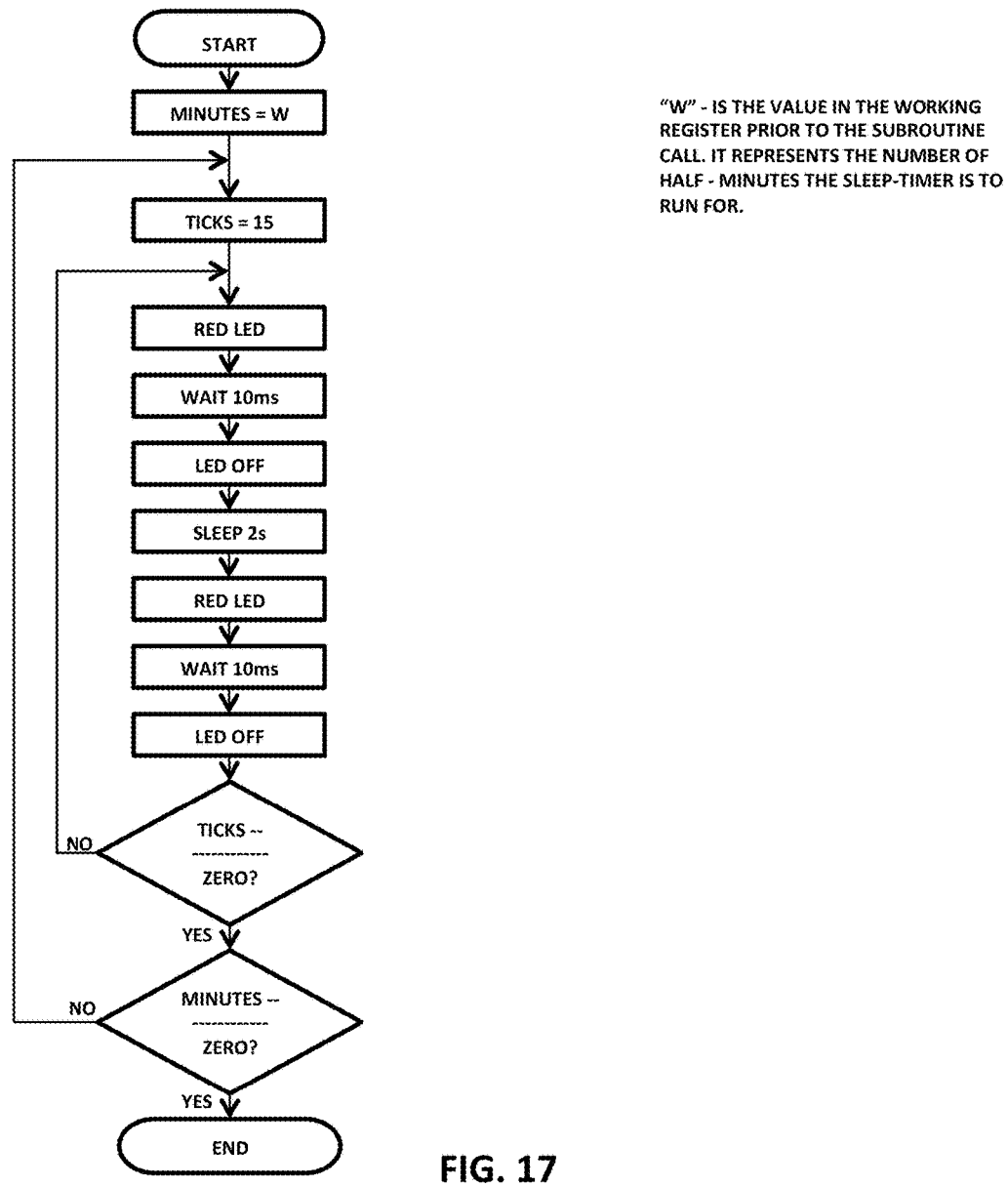
FIG. 17 illustrates an example high level subroutine for a sleep timer process workflow or flow chart according to one non-limiting embodiment of the present disclosure described herein.
Figure 18:
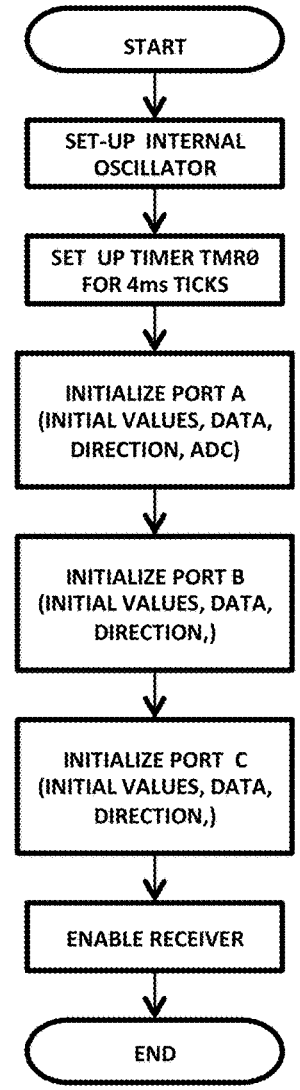
FIG. 18 illustrates an example initialization routine process workflow or flow chart according to one non-limiting embodiment of the present disclosure described herein.
Figure 19:
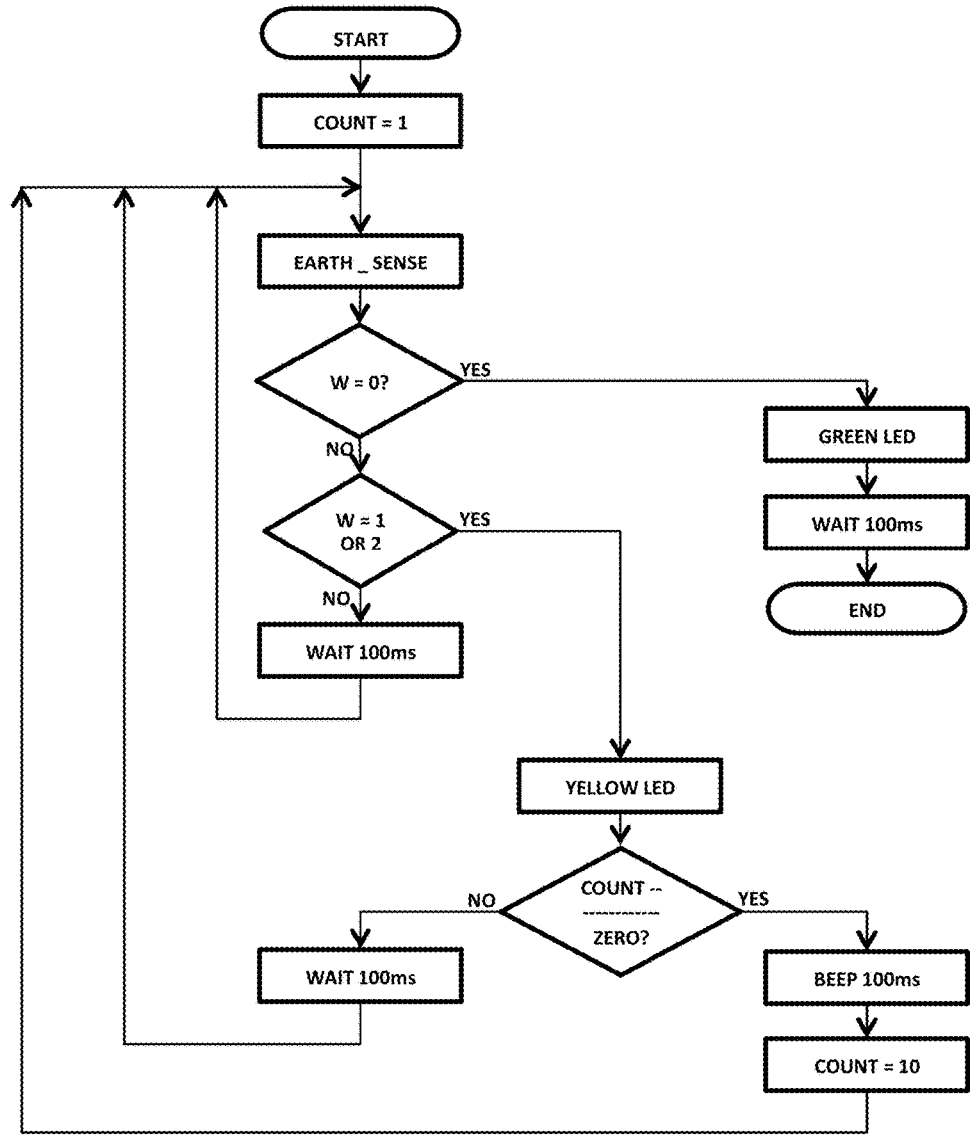
FIG. 19 illustrates an example test earth routine process workflow or flow chart according to one non-limiting embodiment of the present disclosure described herein.
Figure 20:
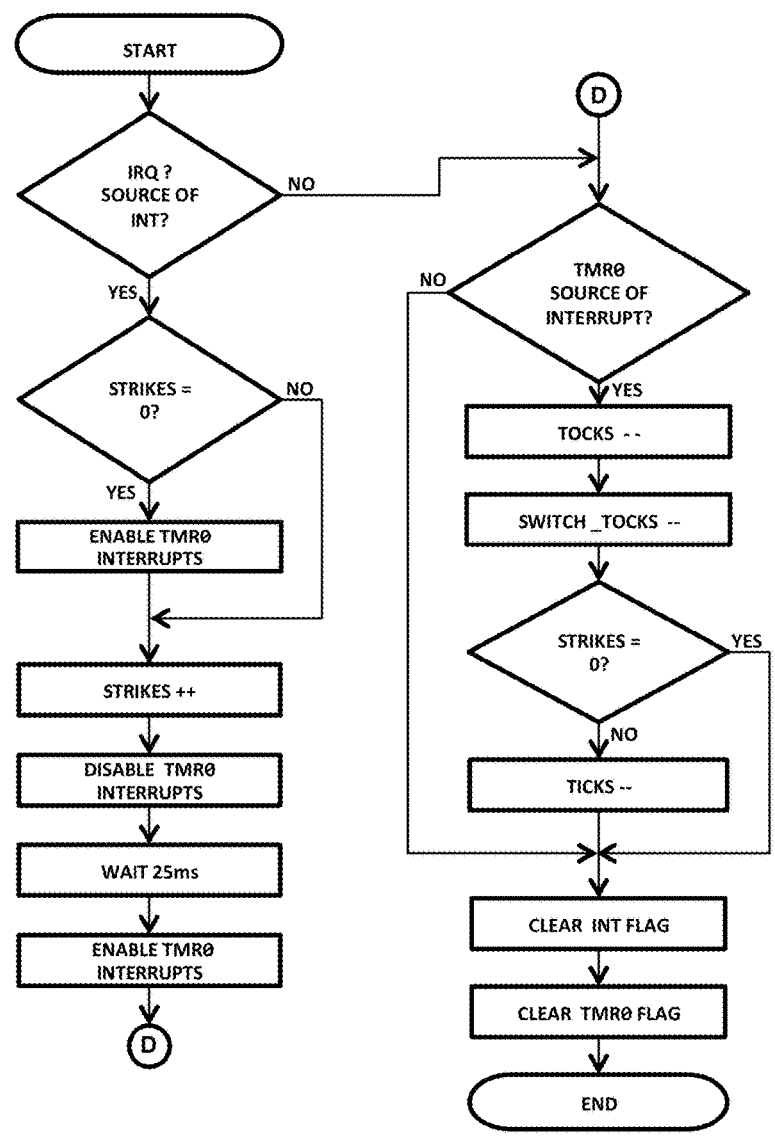
FIG. 20 illustrates an example interrupt service routine process workflow or flow chart according to one non-limiting embodiment of the present disclosure described herein.
Figure 21:
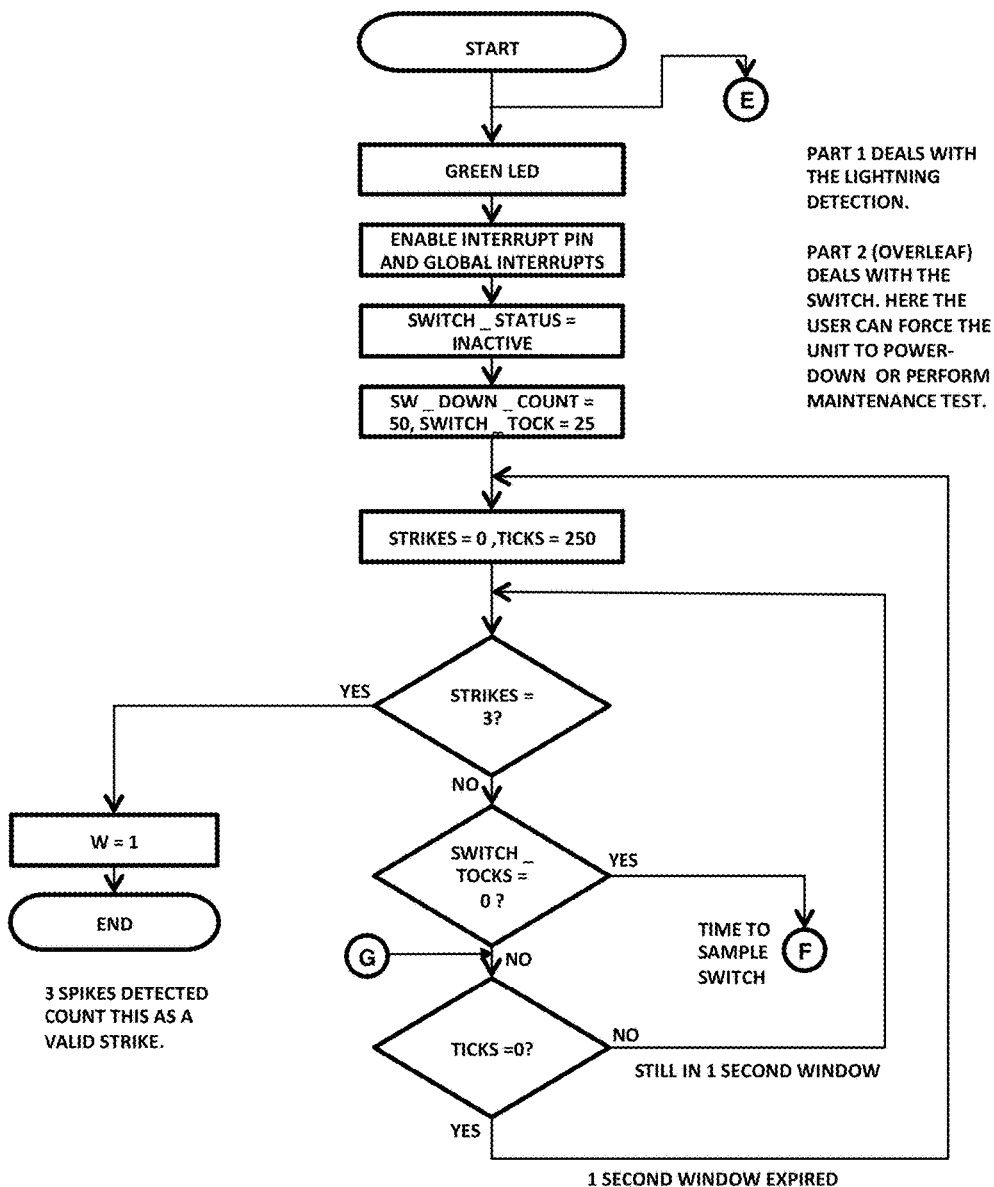
FIG. 21 illustrates an example high level subroutine for an initial detector routine process workflow or flow chart according to one non-limiting embodiment of the present disclosure described herein.
Figure 22:
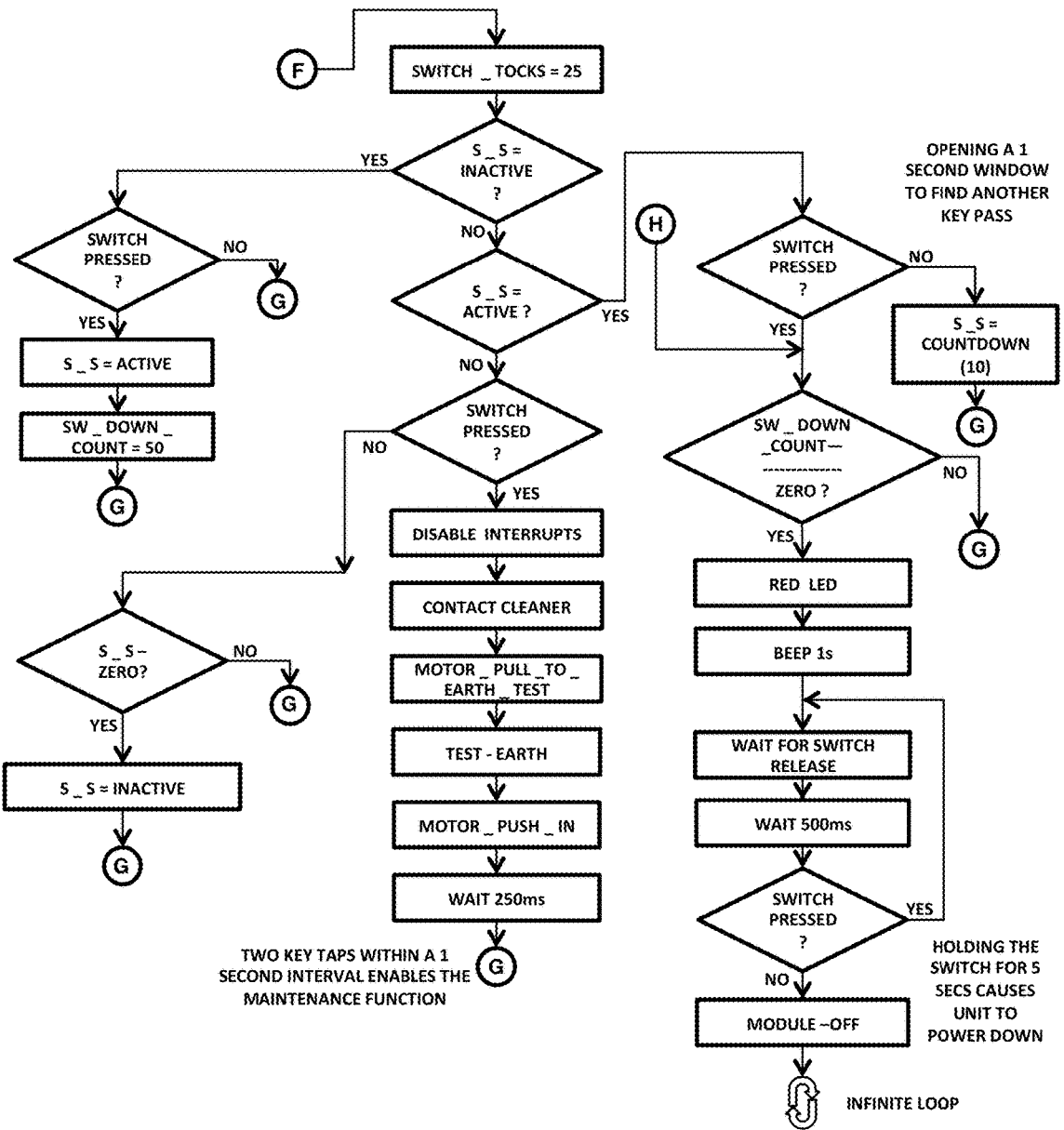
FIG. 22 illustrates a continuation for the flow chart of FIG. 21, further illustrating an example initial detector routine process workflow or flow chart according to one non-limiting embodiment of the present disclosure described herein.
Figure 23:
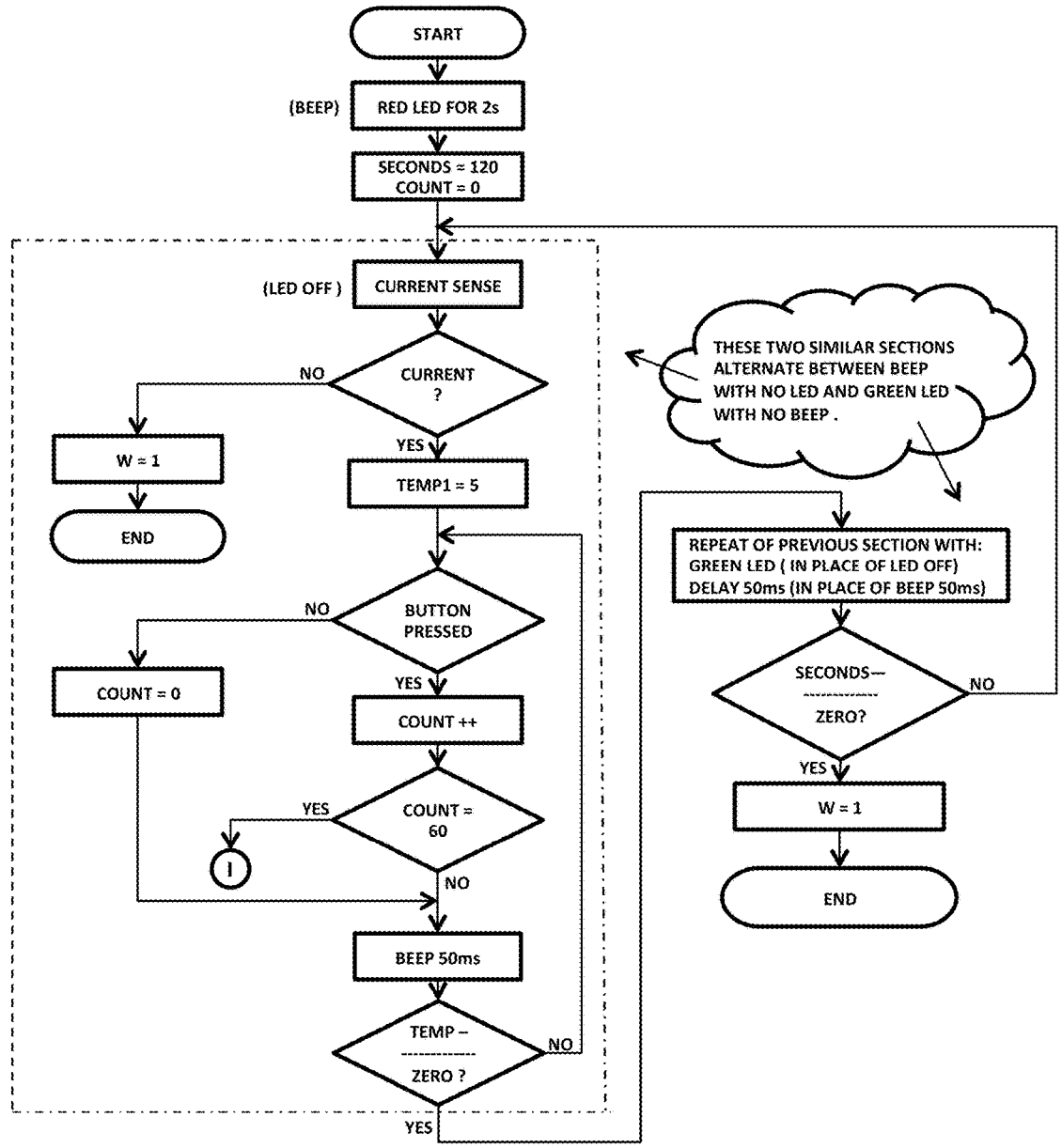
FIG. 23 illustrates an example shut down warning and manual mode routine process workflow or flow chart according to one non-limiting embodiment of the present disclosure described herein.
Figure 23A:
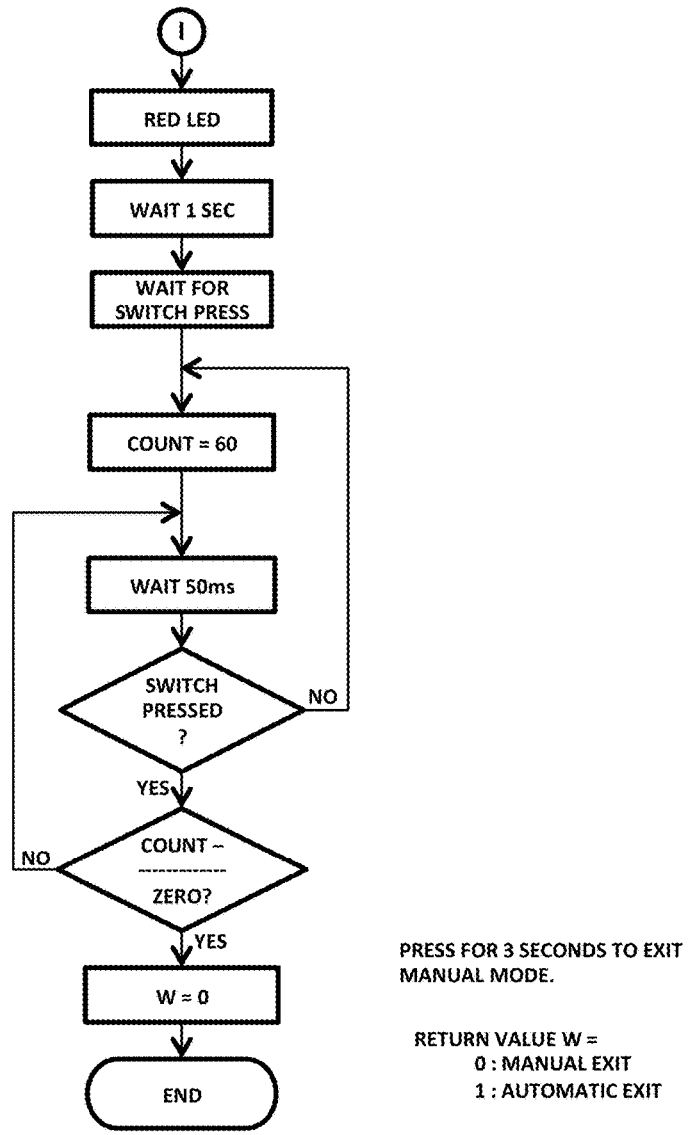
FIG. 23A illustrates an example manual mode routine process workflow or flow chart according to one non-limiting embodiment of the present disclosure described herein.
Figure 24:
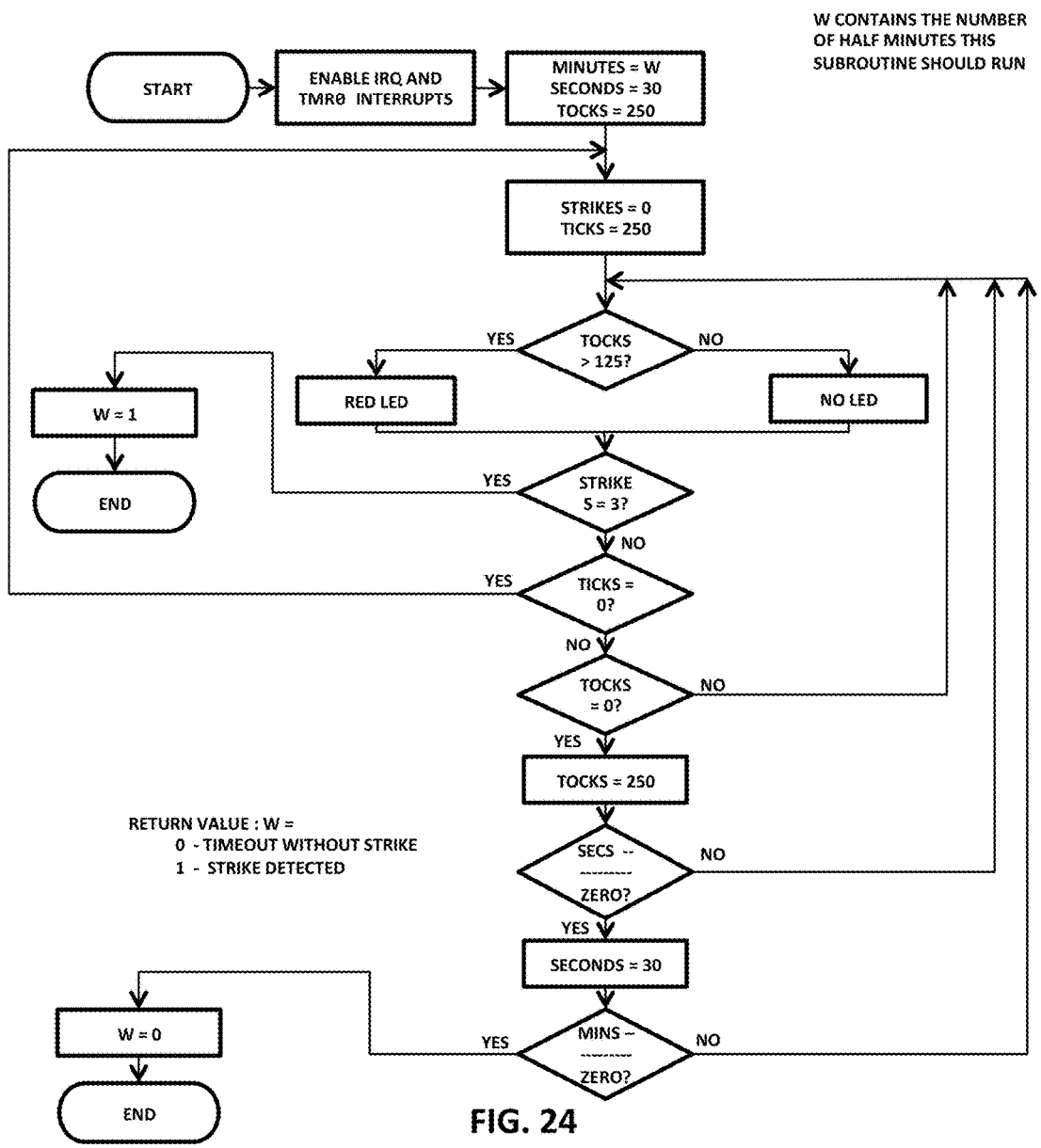
FIG. 24 illustrates an example xmin detector routine workflow or flow chart according to one non-limiting embodiment of the present disclosure described herein.
Figure 25:
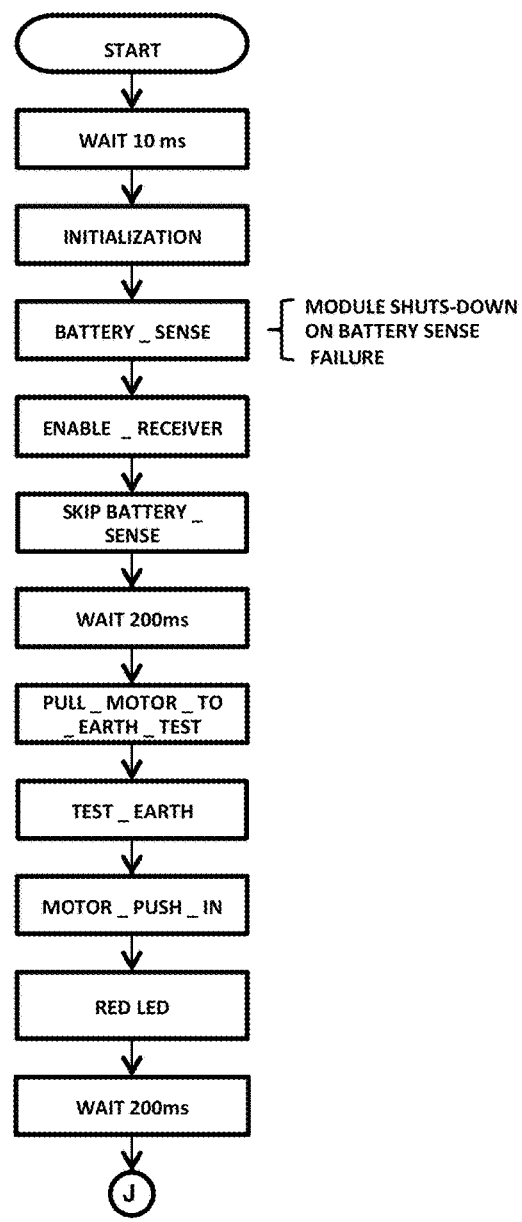
FIG. 25 illustrates an example main program and main loop routine process workflow or flow chart according to one non-limiting embodiment of the present disclosure described herein.
Figure 25:
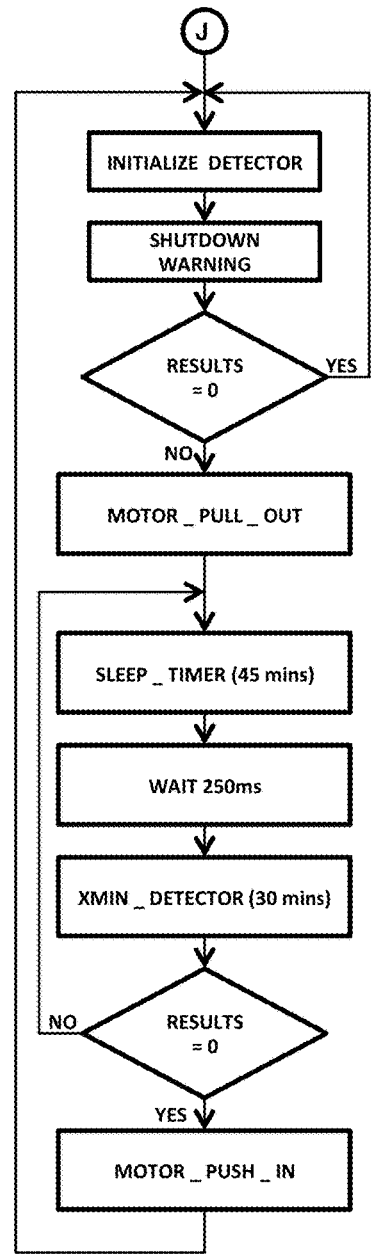
Figure 27:
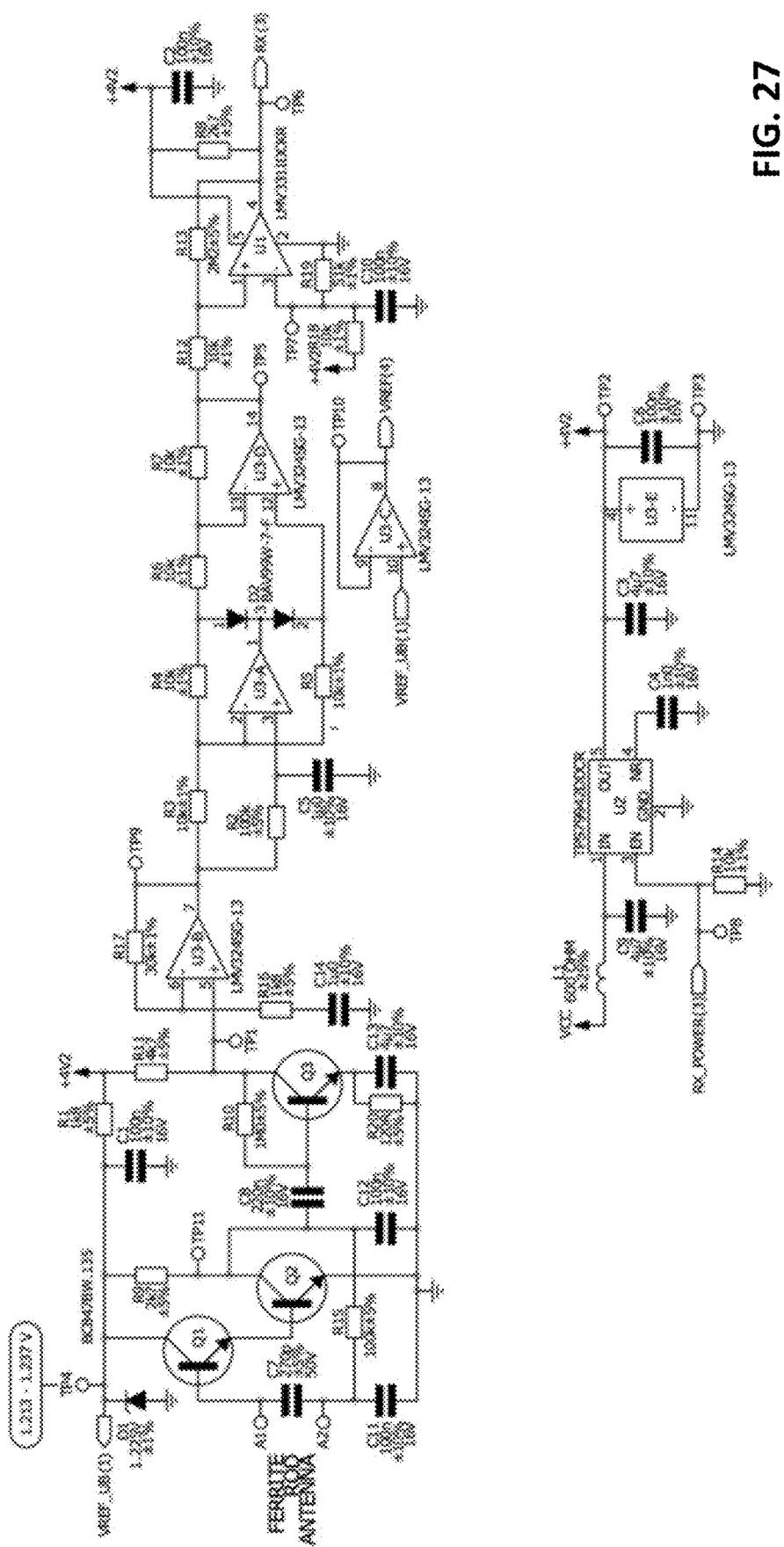
FIG. 27 illustrates an electrical schematic diagram for a main PCB (Printed Circuit Board) of a radio according to one non-limiting embodiment of the present disclosure described herein.
Figure 28:
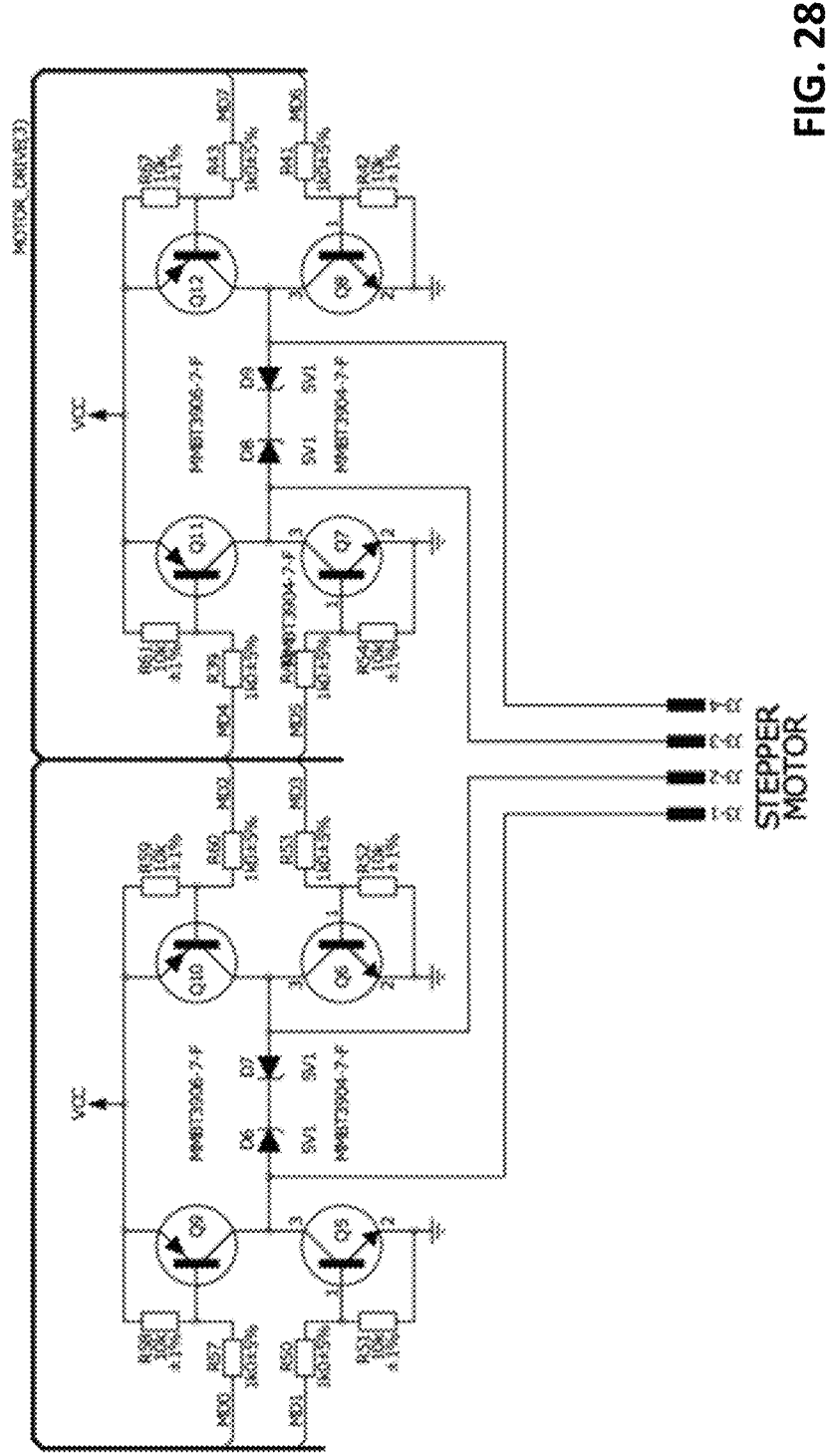
FIG. 28 illustrates an electrical schematic diagram for a main PCB of a stepper motor drive according to one non-limiting embodiment of the present disclosure described herein.
Figure 29:
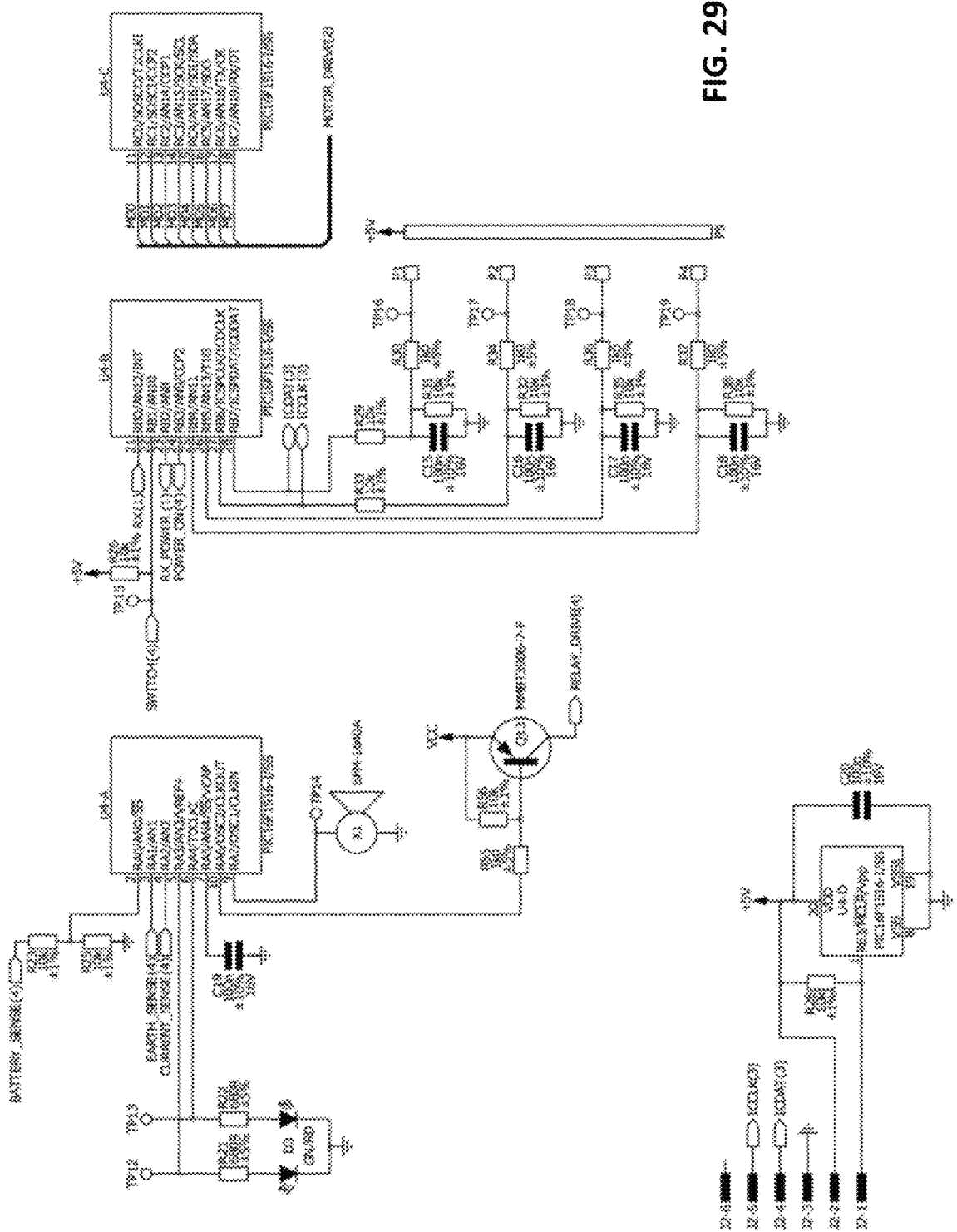
FIG. 29 illustrates an electrical schematic diagram for a main PCB of a processor according to one non-limiting embodiment of the present disclosure described herein.
Figure 30:
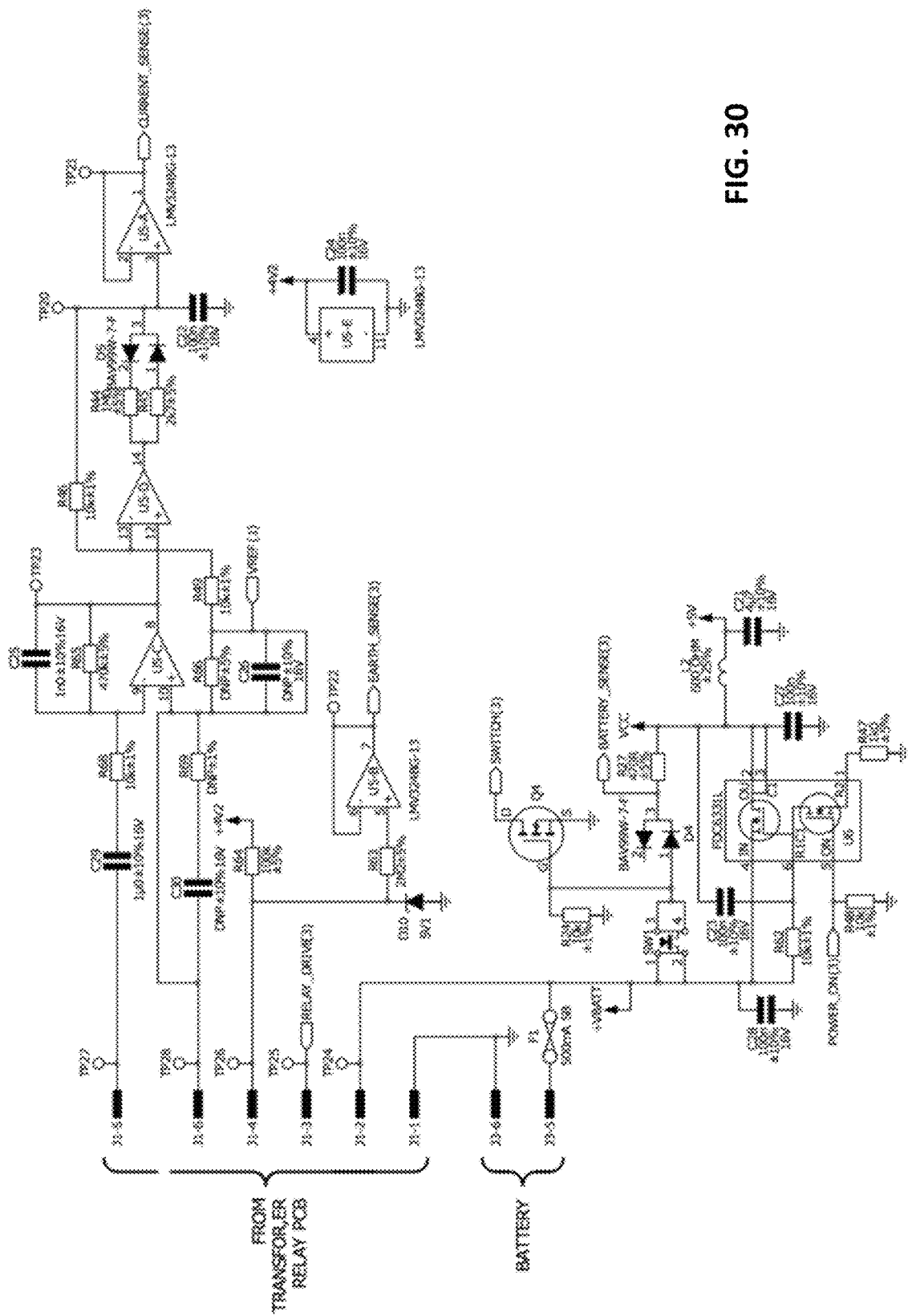
FIG. 30 illustrates an electrical schematic diagram for a main PCB for a PSU and current sense according to one non-limiting embodiment of the present disclosure described herein.
Figure 31:
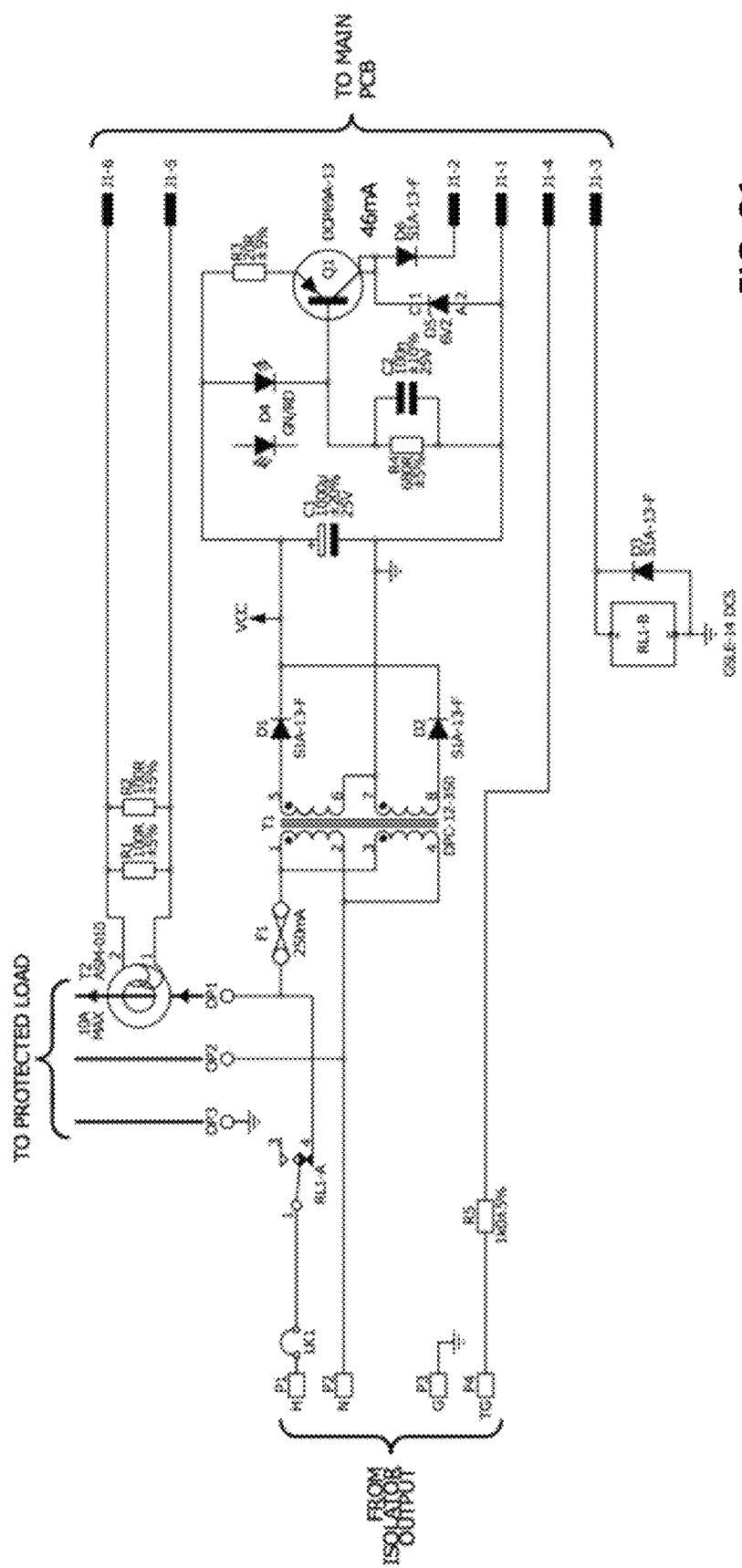
FIG. 31 illustrates an electrical schematic diagram for a main transformer relay PCB according to one non-limiting embodiment of the present disclosure described herein.

Here, FIG. 6 illustrates a low-level subroutine or process flow for a timer operation of the LEMP detector. FIG. 7 illustrates one embodiment for an analog to digital converter routine or process flow for the battery source/detecting and notification method for the LEMP detector. FIG. 8 illustrates one embodiment for an analog to digital converter routine for the current detecting process flow and method for the LEMP detector. FIG. 8A illustrates an analog to digital converter routine for the earth detecting process flow and method for the LEMP detector. FIGS. 9-16 illustrate one or more embodiments for the motor routine and process flows of the LEMP detector. FIGS. 17-25 illustrate one or more embodiments of high level subroutines and process flows for the timer, initialization, and detection method of the LEMP detector.

FIGS. 26-31 illustrate one or more embodiments for electrical schematics and diagrams for one or more of processors, controllers, transformers, and electrical components of the LEMP detector, that further correspond to the one or more routines, algorithms, logic, processes, method, workflow, and flow charts illustrated in one or more of FIGS. 6-25.

Having thus described the several embodiments of the disclosure described herein, those of skill in the art will readily appreciate that other embodiments may be made and used which fall within the scope of the claims attached hereto. Numerous advantages of the disclosure described herein covered by this document have been set forth in the foregoing description. It will be understood that this disclosure is, in many respects, only illustrative. Changes can be made with respect to various elements described herein without exceeding the scope of the disclosure described herein. Although the present disclosure described herein has been described in considerable detail with reference to certain preferred versions or embodiments thereof, other versions and embodiments are possible.

What is claimed is:

1. A lightning detection and electrical device protection apparatus, comprising:
   a housing;
   a coaxial isolation switch;
   a radio receiver;
   a controller having a processor, wherein the controller further comprises an isolation detection unit;
   a drive member;
   one or more input electrical contacts;
   one or more output electrical contacts engaged with the input electrical contacts; and
   wherein in response to the radio receiver detecting one or more lightning strikes, the controller operates the drive member to disengage the input electrical contacts and output electrical contacts from each other.

2. The lightning detection apparatus of claim 1, wherein the radio receiver is tuned to a frequency for detecting one or more lightning strikes.

3. The lightning detection apparatus of claim 1, wherein the output electrical contacts are coupled to a sliding carrier and wherein the carrier is driven by the drive member.

4. The lightning detection apparatus of claim 3, wherein the drive member is further coupled to a drive gear, and wherein the drive gear further drives the carrier.

5. The lightning detection apparatus of claim 1, wherein the input and output electrical contacts are comprised of hot, ground, and neutral leads.

6. The lightning detection apparatus of claim 1, wherein the disengagement of the output electrical contacts from the input electrical contacts provides an air gap configured to prevent an electrical current jump.

7. The lightning detection apparatus of claim 6, wherein the air gap can be from approximately 0.5 mm to 50 mm.

8. The lightning detection apparatus of claim 1, wherein the isolation detection unit determines isolation of one or more connected electronic devices from the mains, thereby not allowing a path for lightning to arc across the input and output electrical contacts.

9. The lightning detection apparatus of claim 1, wherein the coaxial switch disconnects an inner conductor and an outer shield of a coaxial cable to fully isolate a coaxial connection while maintaining a 50 or 75 ohm load.

10. The lightning detection apparatus of claim 1, further comprising a rechargeable battery source.

11. A method of detecting lightning and protecting electrical devices, comprising:
    detecting the presence of one or more lightning strikes, wherein the detecting is performed by one or more radio frequency tuners tuned to one or more frequency ranges of lightning or electromagnetic pulses;
    automatically decoupling electrical contact leads of an output port from the electrical contact leads of an input power port;
    automatically decoupling a coaxial input lead from a coaxial output lead;
wherein the decoupling is further comprised of a motor initiated by a controller to move a carrier coupled to the electrical contact leads of the output port away from the contact leads of the input port and creating an air gap between the input port contacts and output port contacts, thereby preventing electrical current from passing from the input port contacts to the output port contacts; and
    automatically detecting if an electrical signal from the input power port is grounded.

12. The method of claim 11, wherein the decoupling operation is performed if the detection of a lightning or electromagnetic meets a pre-defined threshold parameter.

13. The method of claim 12, wherein the pre-defined threshold parameter is one or more radio frequencies.

14. The method of claim 11, wherein the recoupling operation is performed if no lightning or electromagnetic pulses are detected for a pre-defined time period.

15. The method of claim 11, wherein the detecting further comprises detecting ambient noise from normal environment to eliminate false detection of lightning or electromagnetic pulses.

16. The method of claim 11, wherein the detecting further comprises determining the proximity of the lightning or electromagnetic pulses.

17. The method of claim 11, wherein the detecting further comprises determining the estimated time of arrival of the lightning or electromagnetic pulses.

18. The method of claim 11, wherein the air gap is approximately 0.5 mm to 50 mm.

19. The method of claim 11, further comprising providing one or more notifications or alerts in response to one or more detected lightning strikes or electromagnetic pulses.

20. The method of claim 11, further comprising detecting absolute isolation of one or more electronic equipment from mains, earth ground, and digital connections.

* * * * *